United States Patent
Maeda

(10) Patent No.: US 8,614,801 B2
(45) Date of Patent: Dec. 24, 2013

(54) IMAGE FORMING APPARATUS, CONTROL METHOD, AND CONTROL PROGRAM

(75) Inventor: Yuuki Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 12/179,396

(22) Filed: Jul. 24, 2008

(65) Prior Publication Data

US 2009/0040541 A1 Feb. 12, 2009

(30) Foreign Application Priority Data

Aug. 7, 2007 (JP) .................................. 2007-205409

(51) Int. Cl.
*G06F 3/12* (2006.01)
(52) U.S. Cl.
USPC .......................... 358/1.13; 358/1.15; 358/1.18
(58) Field of Classification Search
USPC ............... 358/1.15, 1.18, 1.13, 1.16, 1.3, 1.4, 358/1.12, 1.17, 488, 296; 399/16, 17, 82, 399/85, 370, 371, 376, 389
See application file for complete search history.

(56) References Cited

U.S. PATENT DOCUMENTS

| | | | |
|---|---|---|---|
| 6,995,860 B2 * | 2/2006 | Roztocil et al. | 358/1.18 |
| 7,394,558 B2 * | 7/2008 | Stringham | 358/1.15 |
| 7,660,001 B2 * | 2/2010 | Kurohata et al. | 358/1.13 |
| 2001/0043346 A1 | 11/2001 | Roztocil | |
| 2004/0130746 A1 * | 7/2004 | Wu | 358/1.15 |
| 2005/0275891 A1 | 12/2005 | Chinwala | |

FOREIGN PATENT DOCUMENTS

| | | |
|---|---|---|
| CN | 1145581 A | 3/1997 |
| CN | 1400103 A | 3/2003 |
| JP | 11-109794 A | 4/1999 |
| JP | 2002-003063 A | 1/2002 |
| JP | 2005-234812 A | 9/2005 |
| JP | 2007-118212 A | 5/2007 |
| JP | 2008-173877 A | 7/2008 |
| JP | 2009-025652 A | 2/2009 |

* cited by examiner

*Primary Examiner* — Vu B Hang
(74) *Attorney, Agent, or Firm* — Canon USA, Inc., IP Division

(57) ABSTRACT

An image forming apparatus receives a printing job from an information processing apparatus and prints the printing job, wherein confirmation printing to confirm the printed material of the printing job is instructed. If the sheet used with the confirmation print is a specialized sheet, printing is performed using the same type of sheet for the confirmation printing and the main printing.

15 Claims, 28 Drawing Sheets

ID_FORMING APPARATUS, CONTROL
IMAGE FORMING APPARATUS, CONTROL METHOD, AND CONTROL PROGRAM

BACKGROUND OF THE INVENTION

1. Field of the Invention

The present invention relates to an image forming apparatus which executes printing processing based on a printing job received from an information processing apparatus.

2. Description of the Related Art

A photocopier and printer, having a tab facing mode which can output printed material with tabbed sheets (also called tab sheets) inserted in predetermined positions of printed material output from an image forming apparatus, for example, have been proposed. Tabbed sheets of a predetermined number are combined to be one set, and for example, for five-tab sheets, five sheets make up one set.

In the case that tab facing positions are only set in three locations, if tabbed sheets where five sheets make up one set are used, after the first through third sheets are used, the fourth and fifth tabbed sheets remain within the image forming apparatus. In this case, the page first using a tab sheet in the next set will be printed using the fourth tab sheet, whereby the user may not obtain desired printed material.

Thus, a method has been proposed in Japanese Patent Laid-Open No. 2002-003063 wherein a user sets the photocopier by removing the extra tabbed sheet before printing or automatically outputting the extra tabbed sheets for each set.

In a printing environment such as a POD market, the quality of printed material as product is highly valued. Accordingly, a function has been proposed to execute printing for confirmation (also may be called "confirmation printing") according to user instructions, even during printing. For example, in the case that executing confirmation printing is instructed during printing of the 51st of 100 pages, the printing apparatus outputs the results of the 51st page confirmation printing to an output unit different from that of the first through 50th pages. In this case, the printing apparatus outputs the 51st page for confirmation printing, while outputting printed material for and after the 51st page again as to the output unit of the first through 50th pages. That is to say, the printing apparatus prints the confirmation printing 51st page and the main printing 51st page.

As a result, the user can confirm color changes, print position changes, and so forth without stopping the printing even during printing of a large number of copies.

However, in the case of executing such printing, the following problems may occur. For example, in a situation wherein, as a result of instructions for confirmation printing while the printing apparatus is continuously executing printing, the pages subjected to confirmation printing use a set sheet such as tabbed sheets. In this case, since the set sheets to be used for the main printing are used for the confirmation printing, desired printing results cannot be obtained.

This problem will be described in detail with reference to FIGS. 23A and 23B. Tab sheets 2403 of which five sheets make up one set are set in a cassette 2402 of the printing apparatus as shown in FIG. 23A. The printing apparatus 2401 prints printing data 2404, and as a result of confirmation printing being instructed at a timing to printing page 2405, the tab sheet to be printed for page 2405 is used for the confirmation printing.

That is to say, the cassette 2407 after confirmation printing does not have the tab sheet on which page 2405 is to be printed. In this state, if the printing apparatus 2401 prints page 2405 again for the main printing, since the page 2405 is printed using the tab sheet 2406, the numeral "5" which is to be printed on the tab sheet is not printed, and the user may not be able to obtain the desired printed material.

Automatically outputting the tab sheets remaining in the cassette 2407 may be considered using the arrangement described in Japanese Patent Laid-Open No. 2002-003063, but after automatic outputting, the state returns to that of cassette 2402. Therefore, in the case of using the leading tab sheet for confirmation printing and for main printing there is no problem, but for example confirmation printing is executed as to pages to be printed using the third sheet out of five tab sheets, and thereafter upon automatically outputting, the tab sheet to be used for the next main printing becomes the first tab sheet. Accordingly, the problems addressed by the present invention cannot be solved even by using the technique in Japanese Patent Laid-Open No. 2002-003063.

SUMMARY OF THE INVENTION

Accordingly, the present invention is directed to outputting desired printed material while realizing confirmation printing.

According to an aspect of the present invention, an image forming apparatus configured to print a printing job received from an information apparatus includes a first determining unit configured to determine pages to be confirmed from pages included in a printing job according to instructions to confirm printed material of a printed job during printing processing of the printing job, a second determining unit configured to determine whether recording medium used to print the pages to be confirmed is specialized recording medium, and a printing control unit configured to print the pages for confirmation using the specialized recording medium if it is determined by the second determining unit that the recording medium used for printing the page to be confirmed is the specialized recording medium, wherein the printing control unit prints the pages to be confirmed using the same type of recording medium as the recording medium used to print for confirmation after printing of the pages for confirmation.

Further features of the present invention will become apparent from the following description of exemplary embodiments with reference to the attached drawings.

BRIEF DESCRIPTION OF THE DRAWINGS

FIG. 11A is a diagram showing a display control example of a user interface unit to be controlled.

FIG. 11B is a diagram showing a display control example of a user interface unit to be controlled.

DESCRIPTION OF THE EMBODIMENTS

Figure 1:
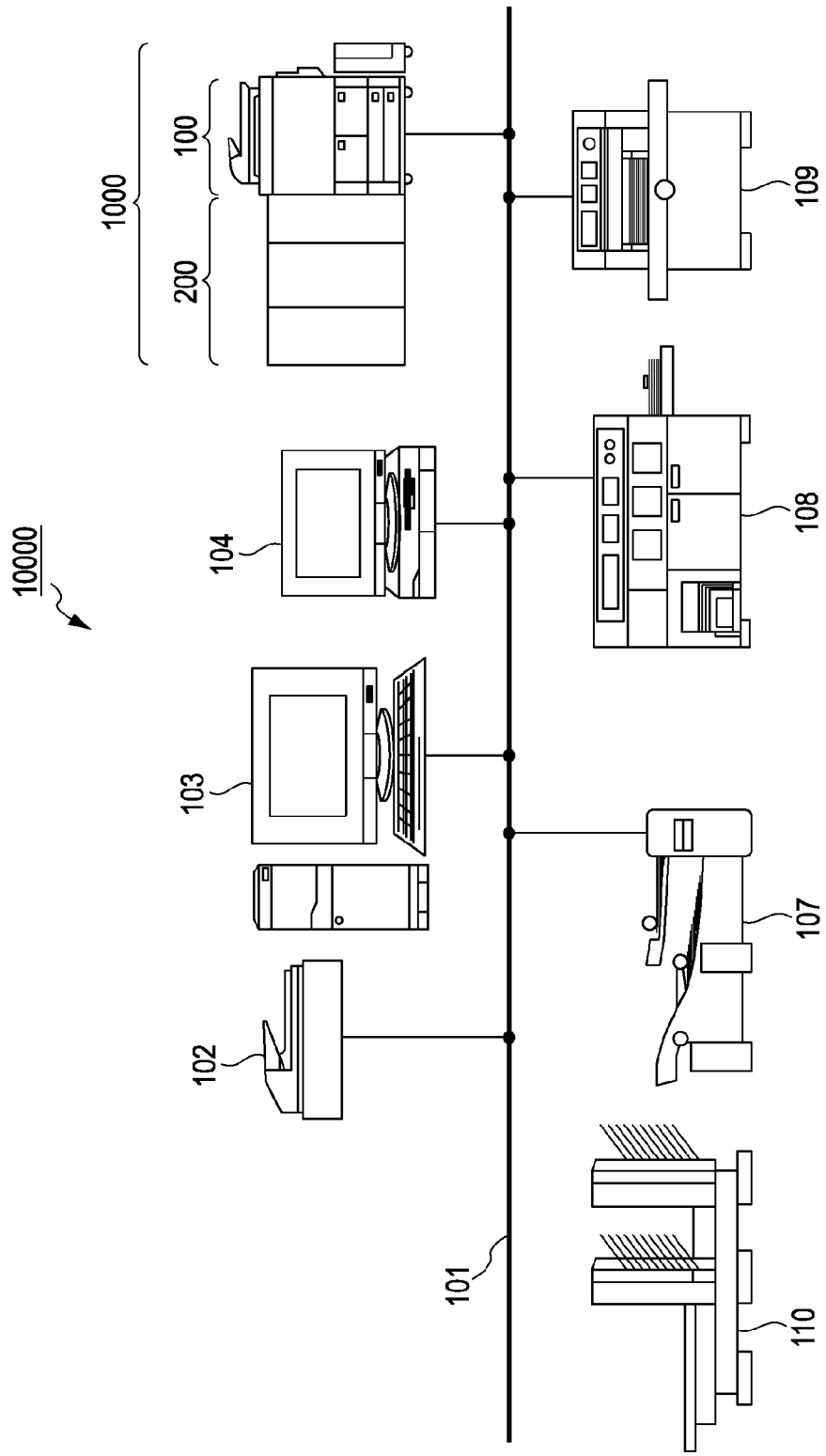
FIG. 1 is a diagram showing an overall configuration example of a printing environment 10000 including a printing system 1000 to be controlled.

Exemplary embodiments of the present invention will be described in detail with reference to the appended drawings.

First Embodiment

The present invention envisions a printing environment which differs from an office environment, such as a POD environment. Accordingly, the system environment of an overall workplace of a POD environment including the printing system 100 (the printing environment 10000 shown in FIG. 1) will be described herein.

Note that with the present embodiment, a printing environment 10000 to which the printing system 1000 can be applied is called a POD system 10000. The POD system 10000 in FIG. 1 has the printing system 1000 of the present embodiment, server computer 103, and client computer 104 (hereafter called PC). Also, the POD system 10000 in FIG. 1 has a sheet-folding apparatus 107, trimming apparatus 109, saddle-stitch binding apparatus 110, case work binding apparatus 108, scanner 102, and so forth. Thus, multiple apparatuses are prepared within the POD system 10000.

The system 1000 has a printing apparatus 100 and sheet processing apparatus 200. Note that with the present invention, the printing apparatus 100 is exemplified and described as a multi-function apparatus having multiple functions such as a copy function and a PC printing function and the like, but a printing apparatus of a single function type may be used. Note that a multi-function apparatus is also called an MFP (Multi Function Peripheral).

The sheet-folding apparatus 107, trimming apparatus 109, saddle-stitch binding apparatus 110, and case work binding apparatus 108 in FIG. 1 are defined as sheet processing apparatuses, similar to the sheet processing apparatus 200 of the printing system 1000. This is because these are devices which can execute sheet processing as to sheets for a job printed with the printing apparatus 100 of the printing system 100. For example, the sheet-folding apparatus 107 executes folding processing for sheets of a job printed with the printing apparatus 100. The trimming apparatus 109 executes trimming processing for sheets printed with the printing apparatus 100 in increments of sheet bundles made up of multiple sheets.

The saddle-stitch binding apparatus 110 executes saddle-stitch binding processing for sheets of a job printed with the printing apparatus 100. The case work binding apparatus 108 is configured to be able to execute case work binding for sheets of a job printed with the printing apparatus 100. However, in the case of executing various types of sheet processing with these sheet processing apparatuses (107 through 110), an operator needs to perform work to remove the printed material from the output unit of the printing apparatus 100, and set such printed material in a sheet processing apparatus for processing.

In other words, in the case of executing sheet processing as to printed material printed with the printing apparatus 100 employing the sheet processing apparatus 200 of the printing system 1000 itself, inserting work by the operator after printing processing is executed by the printing apparatus 100 is unnecessary. This is because the printed material printed with the printing apparatus 100 is sent directly to the sheet processing apparatus 200 and sheet processing is executed. Specifically, a sheet conveyance path within the printing apparatus 100 is communicated to a sheet conveyance path within the sheet processing apparatus 200. Thus, the sheet processing apparatus 200 and printing apparatus 100 of the printing system 1000 itself are physically connected. Also, the printing apparatus 100 and sheet processing apparatus 200 have a CPU, and are configured to be able to communicate data. Thus, the printing apparatus 100 and sheet processing apparatus 200 have an electrical connection relation.

Note that with the present embodiment, the control unit of the printing system performs overall control of the printing apparatus 100 and sheet processing apparatus 200. With the present example, a controller unit 205 within the printing apparatus 100 in FIG. 2 performs overall control. Note that with the present embodiment, the above-described sheet processing apparatuses are also called "post-processing apparatuses" or "post presses".

With the POD system 10000 in FIG. 1, the apparatuses other than the saddle-stitch binding 110 are all connected to a network 101, and are configured so as to be able to communicate data mutually with other apparatuses. For example, the information processing apparatuses such as the PC 103 and 104, which are applicable to an example of external apparatuses, can send printing data to the printing apparatus 100 via a network 101.

The server PC 103 manages the entire job for all jobs to be processed with the present POD environment 10000. In other words, the server PC 103 functions as a computer to perform overall management of the entire series of workflow processes made up from multiple processing processes.

The PC 103 determines post-processing conditions which can be finished with the present environment 10000, based on instructions for a job received from the operator. Also, the PC 103 instructs executing of post-processing (finishing processing) processing as requested by an end user (in this example, a client who has requested print creation). In this event, the PC 103 employs information exchange tools such as JDF to exchange information with the sheet processing apparatus 200.

With the POD environment 10000 having such configuration elements, the above-mentioned sheet processing apparatus 200 is defined in the present embodiment as described below, divided into three types.

Definition 1: A sheet processing apparatus which is an apparatus meeting both Condition 1 and Condition 2 below is defined as an "inline finisher". Note that an apparatus applicable to this definition is also called an inline-type sheet processing apparatus with the present embodiment.

Condition 1: A sheet path (sheet conveyance path) physically connects the inline finisher with the printing apparatus 100 so that the sheets conveyed from the printing apparatus 100 can be directly received without intervention from a user.

Condition 2: The inline finisher is electrically connected to other apparatuses so that the data communication necessary for operational instructions and status confirmation can be made with the other apparatuses. Specifically, the inline finisher needs to be electrically connected with the printing apparatus 100 to enable data communication, or to be electrically connected to an apparatus other than the printing apparatus 100 (e.g. PC 103, 104, or the like) via the network 101 to enable data communication. Condition 2 is considered to have been met by at least one of these conditions being met. That is, the sheet processing apparatus 200 of the printing system 1000 itself is applicable to "inline finisher".

Definition 2: A sheet processing apparatus which is applicable to an apparatus meeting Condition 2 but not meeting Condition 1 out of the above Condition 1 and Condition 2 is defined as a "near-line finisher". Note that an apparatus applicable to this definition is also called a near-line type sheet processing apparatus.

For example, a sheet processing apparatus which does not have a sheet path connected to the printing apparatus 100 and requires a worker (operator) to perform insertion work such as conveying printed material, but which operation instructions and status confirmation is electrically transmittable via a communication unit such as the network 101 or the like, is defined as a "near-line finisher".

That is, the sheet-folding apparatus 107, trimming apparatus 109, saddle-stitch binding apparatus 110, and case work binding apparatus 108 in FIG. 1 are applicable to "near-line finisher".

Definition 3: A sheet processing apparatus which is an apparatus not meeting the conditions of either the above-mentioned Condition 1 and Condition 2 is defined as an "off-line finisher". Note that an apparatus applicable to this definition is also called an off-line type sheet processing apparatus.

For example, a sheet processing apparatus which does not have a sheet path connected to the printing apparatus 100 and requires a worker (operator) to perform insertion work such as conveying printed material, and which does not have a communication unit necessary for operation instructions and status confirmation whereby data communication with other apparatuses cannot be performed, thereby requiring manual work by an operator for conveying output materials, settings for output materials, manual operation input, and status reports generated by the apparatus itself, is defined as an "off-line finisher". That is, the saddle-stitch binding apparatus 110 in FIG. 1 is an "off-line finisher".

Thus, the present POD environment 10000 having various types of sheet processing apparatuses which are divided into three types can execute various sheet processing.

A near-line finisher or off-line finisher managed by the server PC 103 also includes various apparatuses such as a stapling dedicated apparatus, hole-punch dedicated apparatus, a mail-inserting apparatus, or a collator. The server 103 can know the device status or job status using sequential polling, etc., with a protocol determined beforehand and these near-line finishers, via the network 101. Also, the server PC 103 manages the execution status (progress status) for each job to be processed with the present environment 10000.

Note that the present embodiment may have a configuration wherein the above-described multiple recording sheet processing can be executed each with separate sheet processing apparatuses, or may have a configuration wherein one sheet processing apparatus can execute multiple types of recording sheet processing. Also, an arrangement may be made wherein the system has one sheet processing apparatus out of multiple sheet processing apparatuses.

The printing 1000 in FIG. 1 has a printing apparatus 100 and a sheet processing apparatus 200 which is detachable from printing apparatus 100. The sheet processing apparatus 200 is an apparatus which can receive sheets of a job printed with the printing apparatus 100 via a sheet conveyance path. Also, the sheet processing apparatus 200 executes the sheet processing requested by the user along with a printing execution request via a user interface unit as to the sheet printed with a printer unit 203 of the printing apparatus 100.

Note that the sheet processing apparatus 200 of the present embodiment can also be defined as a group of multiple sheet processing apparatuses which are mutually independently housed and independently usable. The printing system 1000 shown in FIG. 1 is made up of the printing apparatus 100 and three sheet processing apparatuses. Such a configuration whereby multiple sheet processing apparatuses are connected to the printing apparatus 100 is called a cascade connection. The multiple sheet processing apparatuses which are connected to the printing apparatus 100 with a cascade connection are handled as inline finishers. In this case, the controller 205 in FIG. 2, performs overall control of the printing apparatus 100 and the multiple inline type sheet processing apparatuses, and executes various types of control as described below.

Internal Configuration of System 1000

Next, the internal configuration of the printing system 1000 will be described with reference to the system block diagram in FIG. 2. The units illustrated in FIG. 2, with the exception of the sheet processing apparatus 200, are included in the printing apparatus 100.

The printing apparatus 100 has a non-volatile memory such as a hard disk 209 (HD) which can store data of multiple jobs to be processed within the printing apparatus 100 itself.

The printing apparatus 100 has a copy function to print job data received from the scanner unit 201 with the printer unit 203 via the HD 209.

The printing apparatus 100 has a printing function to print job data received from external apparatuses, such as the PC 103 and 104, via the external interface unit 202 with the printer unit 203 via the HD 209. Note that the printing apparatus 100 may be configured as a color printer or monochrome printer, so long as the present invention can be executed.

The printing apparatus 100 has an operating unit 204, which for example, can be a user interface. Another example of a user interface is, for example, the display units (not shown) and keyboards or mice (not shown) of the external apparatuses, i.e., PC 103 and 104.

The controller unit 205 performs overall control of the of the printing system 1000. Various types of control programs, which include programs to execute various types of processing in the flowcharts described below, are stored in the ROM 207.

The control unit 205 executes various types of operations by reading and executing programs in ROM 207. The ROM 207 also stores programs to execute the operations of interpreting the PDL (page description language) received from the external apparatus, e.g. PC 103 and 104 and expanding the raster image data (bitmap image data).

The ROM 207 is read-only memory, and has various types of programs stored such as boot sequence and font information programs and the above-mentioned programs. The RAM 208 is readable and writable memory, and stores image data sent from the scanner unit 201 or external interface 202 via the memory controller and various types of programs and setting information.

The HDD 209 is a large-capacity storage apparatus which stores image data compressed by a compression/decompression unit 210. The HDD 209 is arranged to hold multiple print data of jobs to be processed. The control unit 205 controls data of jobs to be processed which are input via various types of input units, such as the scanner unit 201 and external interface unit 202 to be printable with the printer unit 203 via the HDD 209. The control unit also 205 sends data to the external apparatuses via the external interface 202. Further, the control unit 205 controls the output processing as to the data for jobs to be processed which are stored in the HDD 209. The compression/decompression unit 210 performs compression/decompression operations of the image data stored in the RAM 208 and HDD 209 with various types of compression methods, such as JBIG and JPEG.

Apparatus Configuration of System 1000

Figure 3:
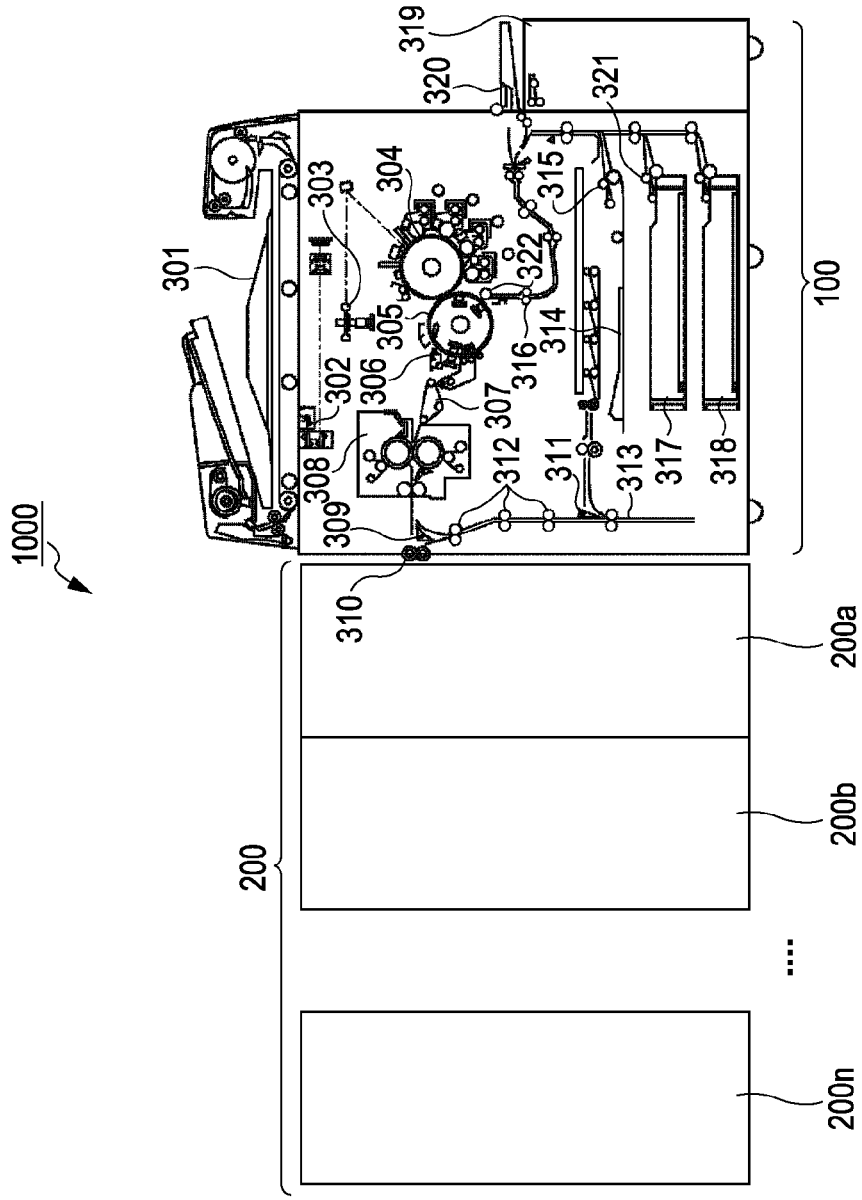
FIG. 3 is a diagram showing a configuration example of a printing system 1000 to be controlled.

Next, the configuration of the printing system 1000 will be described with reference to the apparatus configuration description diagram in FIG. 3. Note that as described above, with the printing system 1000, multiple inline type sheet processing apparatuses are configured in cascade connection with the printing apparatus 100. Also, the inline type sheet processing apparatuses which can be connected to the printing apparatus 100 are arranged to be set with an arbitrary number of units according to the usage environment to increase the effects of the present embodiment under specified restrictions.

Figure 2:
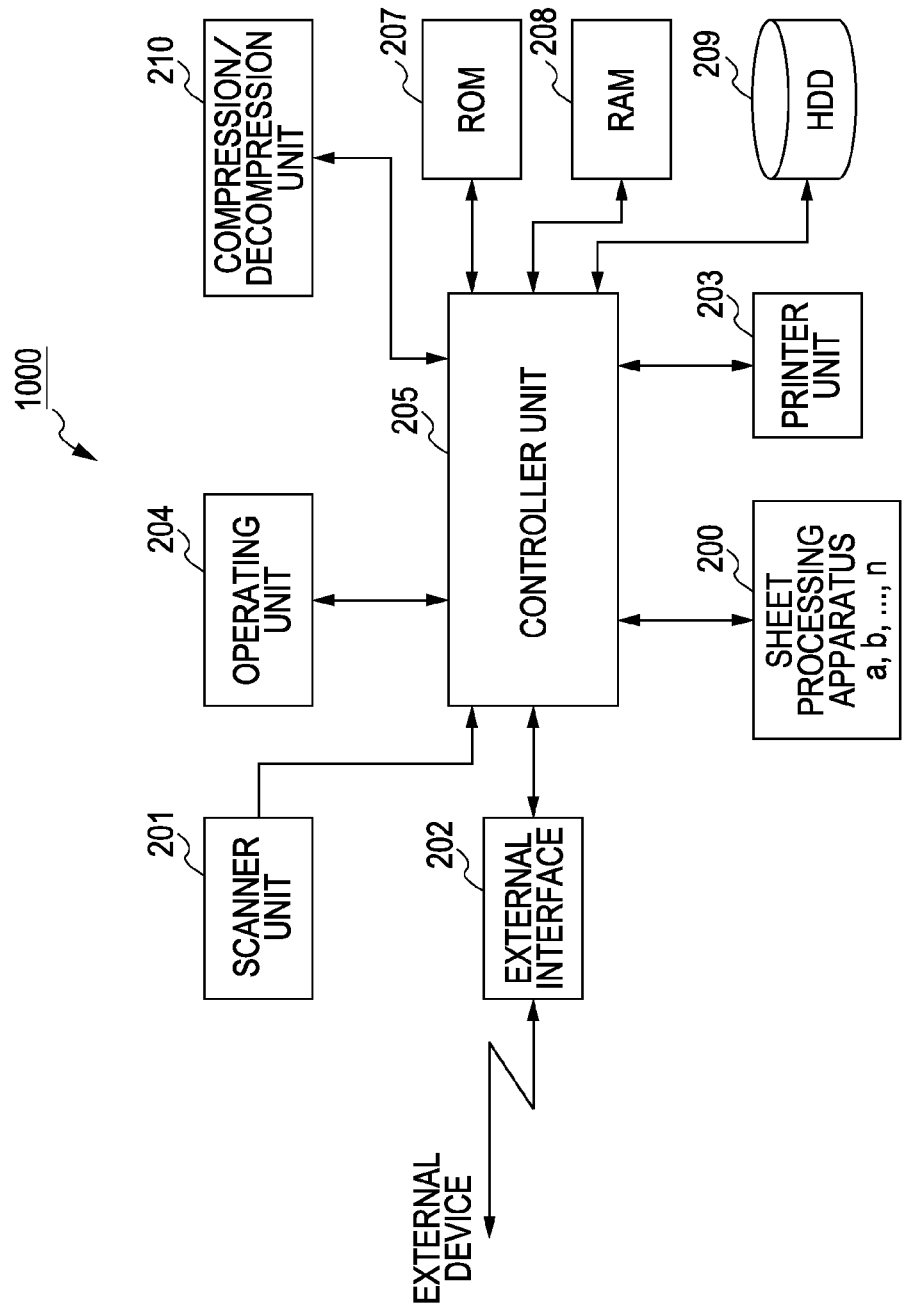
FIG. 2 is a diagram showing a configuration example of a printing system 1000 to be controlled.

As illustrated in FIG. 2, an "N" number of sheet processing apparatuses 200 can be connected as a sheet processing apparatus series group. As illustrated in FIG. 3, starting with the first sheet processing apparatus, the sheet processing apparatuses are shown as sheet processing apparatus 200a, 200b, . . . and the Nth sheet processing apparatus is shown as "sheet processing apparatus 200n".

First, the configuration of the printing apparatus 100 will be described. Reference number 301 denotes the mechanical configuration of the scanner unit 201 in FIG. 2, and reference numbers 302 through 320 denote the mechanical configuration of the printer unit 203 in FIG. 3. Note that with the present embodiment, the configuration of a 1D type color MFP will be described, but another type may be employed.

An automatic document feeding apparatus (ADF) 301 conveys an original document set on a loading face of the document tray onto the platen glass in page sequence starting with the first page of the document. The scanner 302 reads the image of the document conveyed onto the platen glass, and converts this to image data with a CCD. A rotation multi-face mirror (e.g., polygon mirror) 303 allows incident light of a beam, such as laser light, which has been modulated according to the image data, and irradiates the photosensitive drum 304 as reflective scanning light via a reflective mirror. The latent image formed on the photosensitive drum 304 by the laser light is developed with toner, and transfers the toner image as to a sheet member adhered onto the transfer drum 305.

A full-color image is formed by sequentially executing this series of image forming processes as to yellow (Y), magenta (M), cyan (C), and black (K) toner. Following four image forming processes, the sheet member on the transfer drum 305 whereupon a full-color image is formed is separated by a separating claw 306, and is conveyed to a fusing unit 308 by a pre-fusing conveyer 307.

The fusing unit 308 is made up of a combination of rollers and belts, has a heat source such as a halogen heater, and melts and fuses the toner on the sheet member to which the toner image is transferred with heat and pressure. An output flapper 309 is configured to be swingable on a swinging shaft as the center, and regulates the conveyance direction of the sheet member. When the output flapper 309 swings in the clockwise direction, the sheet member is conveyed straight, and is outputted outside of the apparatus by the output roller 310. In the event of forming an image on both sides of the sheet member, the output flapper 309 swings in the counter-clockwise direction, and the path of the sheet member is changed to the lower direction and is sent into a duplex conveyance unit. The duplex conveyance unit has a flapper 311, reverse roller 312, reverse guide 313, and duplex tray 314.

A reverse flapper 311 is configured to be swingable with a swinging shaft as the center, and regulates the conveyance direction of the sheet member. In the case of processing a duplex printing job, the control unit 205 swings the reverse flapper 311 in the counter-clockwise direction and controls the sheet subjected to printing on the first side with the printer unit 203 to send the sheet into the reverse guide 313 via the reverse roller 312. In the state of the sheet member trailing edge being gripped with the reverse roller 312, the reverse roller 312 is temporarily stopped, and the reverse flapper 311 then swings in the clockwise direction. Also, the reverse roller 312 is rotated in the inverse direction. Thus, the sheet is conveyed in a switchback, and is controlled so that the sheet is led to the duplex tray 314 in a state with the trailing edge and leading edge of the sheet having been reversed.

At the duplex tray 314 the sheet members are temporarily stacked, and after this, the sheet members are sent into a register roller 316 again by a resupply roller 315. At this time, the sheet members are sent with the side opposite the transfer process of the first time as the side facing the photosensitive drum. Similar to the above-described process, the second image is formed on the second side of the sheet. Thus images are formed on both sides of the sheet member, and the sheet is outputted to the outside of the printing apparatus main unit internal portion after a fusing processing via the output roller 310. The control unit 205 executes a duplex printing sequence, whereby duplex printing as to the first side and second side of the sheet with data of the job to be subjected to duplex printing is executable with the printing apparatus.

The sheet supply conveyance unit includes sheet supply cassettes 317 and 318 (e.g. each with 500-sheet capacity), a sheet deck 319 (e.g. 5000-sheet capacity), and a manual feed tray 320 as a sheet supply unit to store the sheets necessary for printing processing. Also, the unit to supply the sheets stored in these sheet supply units include a sheet supply roller 321, register roller 316, and so forth. Sheets of various sheet sizes and of various types of materials can be separated and set for each of these sheet supply units of the sheet supply cassettes 317 and 318, and sheet deck 319.

The manual feed tray 320 is also configured so that various types of printing media, including specialized sheets such as OHP sheet, can be set. A sheet supply roller 321 is provided to each of the sheet supply cassettes 317 and 318 and sheet deck 319 and manual feed tray 320, so that sheets can be supplied continuously one sheet at a time. For example, the stacked sheet members are sequentially taken by the pick-up roller, multiple sheets being taken is prevented by the separating roller provided facing the sheet supply roller 321 so that the sheet members are sent one sheet at a time to the conveyance guide. The driving force to rotate the separating roller in the opposite direction from the conveyance direction is input via a torque limiter (not shown). When only one sheet member is entering the nip formed between the sheet supply rollers, the rollers rotate in the conveyance direction along with the sheet members.

In the case that multiple sheets are taken, the extra sheet member is returned by rotating in the reverse direction from the conveyance direction so that only the uppermost one sheet is sent. The sent sheet member is guided between the conveyance guides, and is conveyed by multiple conveyance rollers to the register roller 316. At this time the register roller 316 is stopped, the leading edge of the sheet member is abutting against the nip of a register roller 316 pair, and the leading edge of the sheet member forms a loop whereby skewing is corrected. After this, the register roller 316 begins rotating to convey the sheet member, matching the timing of the toner image formed on the photosensitive drum 304 in the image forming unit. The sheet member sent by the register roller 316 is adhered to the transfer drum 305 surface by static electricity with an adhering roller 322. The sheet member outputted from the fusing unit 308 is guided to the sheet conveyance path within the sheet processing apparatus 200 via the output roller 310.

A data source for a job for which a printing execution request is received from the operating unit 204 can be, for example, a scanner unit 201. Another data source of a job for which a printing execution request is received can be a host computer.

The control unit 205 stores printed data of a job to be processed in the HD 209 in sequence from the leading page, reads the printed data of the job from the HD 209 in sequence from the leading page, and forms the image of the printing data on the sheet. Such leading page processing is performed in sequence.

The control unit 205 supplies the sheets to be printed sequentially from the leading page to the sheet conveyance path within the sheet processing apparatus 200 with the image face downwards. In order to do so, the switchback operation for reversing the front and back of the sheet from the fusing unit 308 is executed employing the units 309 and 312 immediately prior to guiding the sheet to the sheet processing apparatus 200 unit with the output roller 310. Such sheet handling controls for handling leading page processing is also executed by the control unit 205.

Next, the configuration of the inline type sheet processing apparatus 200 which belongs to the printing system 1000 along with the printing apparatus 100 will be described. The system 1000 of the present embodiment in FIG. 3 has an n number of inline type sheet processing apparatuses which can be connected as a cascade to the printing apparatus 100. Note that the number of connectable inline type sheet processing apparatuses is optional. For example, even in the case of using no inline type sheet processing apparatuses (i.e. 0 apparatuses), the printing apparatus 100 of the present embodiment can be used.

Also, in the case of cascade connection of multiple inline type sheet processing apparatuses to the printing apparatus 100, the connection order of the multiple sheet processing apparatuses is also optional.

The present invention is not limited to the configuration described above. For example, a system configuration may be used whereby the number of inline-type sheet processing apparatuses usable by the printing system 1000 and the connection order of the apparatuses thereof are uniformly regulated. At the least, if at least one of the various types of job controls to be described later is configured to be executable, such a system is included in the scope of the present invention.

Figure 4:
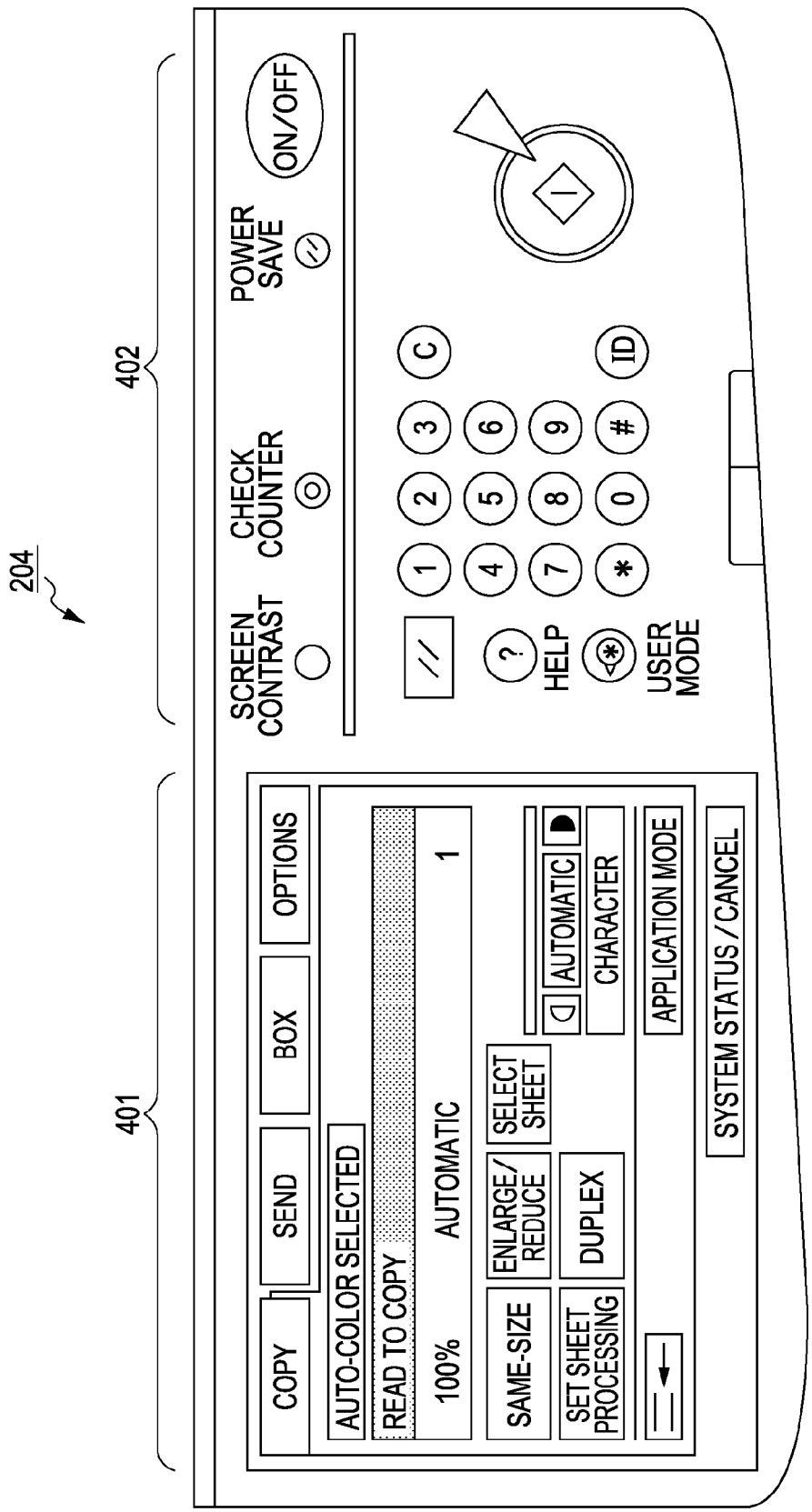
FIG. 4 is a diagram showing an example of a user interface unit to be controlled.

An operating unit 204 exemplifying a user interface unit (hereinafter, UI unit) of the printing apparatus 100 of the system 1000 will be described with reference to FIG. 4.

The operating unit 204 has a key input unit 402 which can receive user operations with hard keys and a touch panel unit 401 which can receive user operations with software keys (also known as "soft keys" or "display keys").

Figure 5:
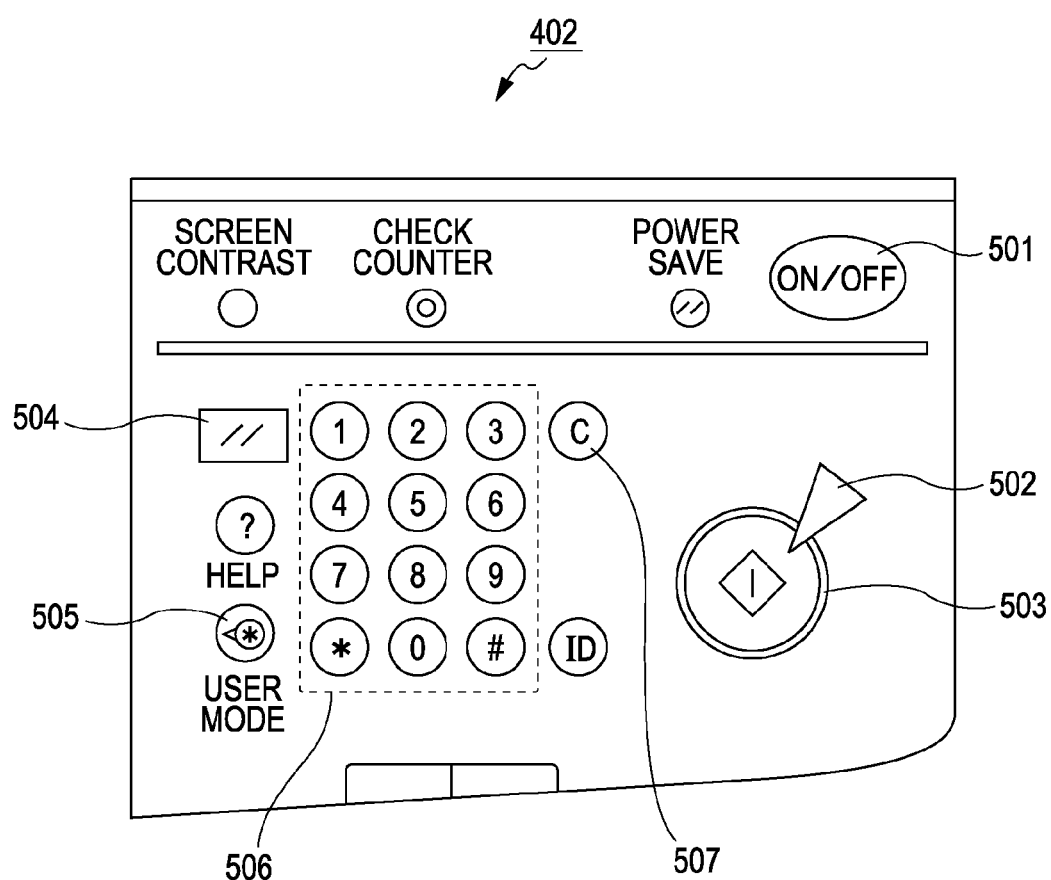
FIG. 5 is a diagram showing an example of a user interface unit to be controlled.

As shown in FIG. 5, the key input unit 402 has an operating unit power switch 501. The control unit 205 responds to user operation of the switch 501, and performs control to selectively switch between a standby mode (normal operating state) and sleep mode (state of stopping a program in an interrupt-standby state in anticipation of network printing, etc., and suppressing power consumption). The control unit 205 controls the user operation of the switch 501 so that a main power switch (not shown) performing power supply of the entire system is in the ON state.

A start key 503 is a key for enabling the user to instruct the printing apparatus 100 to start the types of jobs instructed by the user, such as copying operations or sending operations for the job to be processed. A stop key 502 is a key for enabling the user to instruct the printing apparatus to stop the processing of the received job. A numeric keypad 506 is a keypad to enable setting of setting values for various types of settings. A clear key 507 is a key to clear various types of parameters such as the setting values set by the user via the keypad 506. A reset key 504 is a key to invalidate all of the various types of setting set as to the job to be processed by the user, and to enable receiving instructions to revert the setting values to default state. A user mode key 505 is a key to move the user to a system setting screen.

Figure 6:
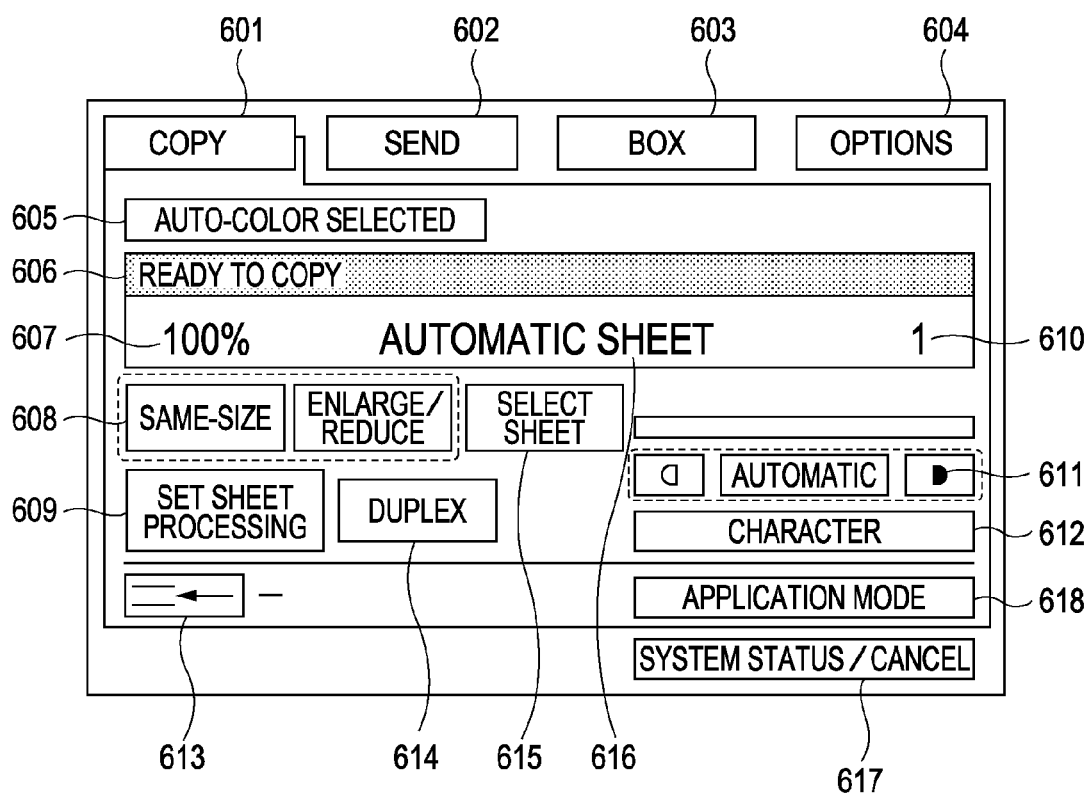
FIG. 6 is a diagram showing a display control example of a user interface unit to be controlled.

FIG. 6 is a diagram illustrating the touch panel unit 401. The touch panel unit 401 has a touch panel display made up of a Liquid Crystal Display (LCD) and a transparent electrode pasted thereupon. The touch panel unit 401 receives various types of settings from the operator and displays information to the operator. For example, upon detecting that the user has pressed a location on the LCD, the control unit 205 follows a display control program stored in the ROM 207 to control what is to be displayed on the LCD of the touch panel unit 401. FIG. 6 is an example of an initial screen displayed on the touch panel unit 401 when the printing apparatus 100 state is in standby mode, i.e., a state with no job to be processed by the printing apparatus 100.

When a copy tab 601 is pressed by the user, the control unit 205 displays an operating screen for the copy function of the printing apparatus 100 on the touch panel unit 401. When the transmission tab 602 is pressed by the user, the control unit 205 displays an operating screen with a data sending (Send) function, such as fax or E-mail, on touch panel unit 401 of the printing apparatus 100. When a box tab 603 is pressed by the user, the control unit 205 displays an operating screen for the box function of the printing apparatus 100 on the touch panel unit 401.

A box function is a function using virtual multiple data storage boxes (hereinafter called box) in the HDD 209. With this function, the control unit 205 enables the desired box of a user to be selected by the user via the user interface unit, and to enable receiving the desired operation from the user. For example, the control unit 205 responds to instructions from the user, which are input via the operating unit 204, and enables the document data of the job received from the scanner 201 of the printing apparatus 100 to be stored in the HDD 209 to the box selected by the user. Data of a job from an external apparatus (e.g. host computer 103 and 104) received via the external interface unit 202 can also be stored in the box selected by the user. The control unit 205 outputs data of a job stored in the box selected by the user according to the user instructions from the operating unit 204.

When an options tab 604 is pressed, the control unit 205 displays a screen to set optional functions, such as scanner settings, on the touch panel unit 401. When the user presses a system status/cancel key 617, a display screen to notify the user of the state or status of the MFP is displayed on the touch panel unit 401.

An autocolor selected key 605 enables the user to select color copying, monochrome copying, or automatic selection beforehand. A size ratio setting key 608 is a key for displaying a setting screen on the touch panel unit 401 to enable the user to execute size ratio settings such as same-size, enlarge, and reduce.

In the case that the user presses a duplex key 614, the control unit 205 displays on the touch panel unit 401 either simplex printing or duplex printing that is to be executed with the printing processing of the job to be processed. In response to the user pressing a select sheet key 615, the control unit 205 displays a screen on the touch panel unit 401 to enable the user to set the sheet supply unit, sheet size, and sheet type (media type).

In response to the user pressing the character key 612, the control unit 205 displays a screen on the touch panel unit 401 enabling the user to select the image processing mode applicable to the document image, such as text mode or photography mode. Also, by the user operating a density setting key 611, the density of the output image of the job to be printed can be adjusted.

The control unit 205 displays an operation state of an event currently occurring with the printing apparatus 100, such as standby status, warming up, printing, jam, error, etc., in a status display area 606 of the touch panel unit 401. The control unit 205 displays information for the user to confirm printing size ratio of a job to be processed and the sheet size and supply mode of the job to be processed.

Information for the user to confirm the number of copies to be printed for the job to be processed, and which page is currently being printed, is displayed in the display area 610. Thus, the control unit 205 displays various types of information to communicate to the user on the touch panel unit 401.

Further, in the case that an interrupt key 613 is pressed by the user, the control unit 205 stops the printing of the job being printed with the printing apparatus 100. In the case that an application mode key 618 is pressed, a screen is displayed to perform settings for image processing layouts such as continuous photo pages, cover/facing sheet settings, reduction layout, image moving, etc.

The control unit 205 displays a screen to receive an executing request from a user for sheet processing as to the inline type sheet processing apparatus. For example, if the user presses a sheet processing setting key 609 (also called "finishing key"), selection options for sheet processing executable with the inline type sheet processing apparatus of the system 1000 are displayed as illustrated in display 700 in FIG. 7.

The control unit 205 performs control to enable the execution request for sheet processing to be executed on the sheets printed in the job to be processed by the inline sheet processing apparatus.

The control unit 205 determines which of the sheet processing apparatus options selectable with display 700 is the sheet processing apparatus that the system 1000 has. For example, in display 700, one of the multiple types of sheet processing given below as to the sheets printed with the printer unit 203 is permitted to receive an executing request from the user for a sheet processing type.

Figure 7:
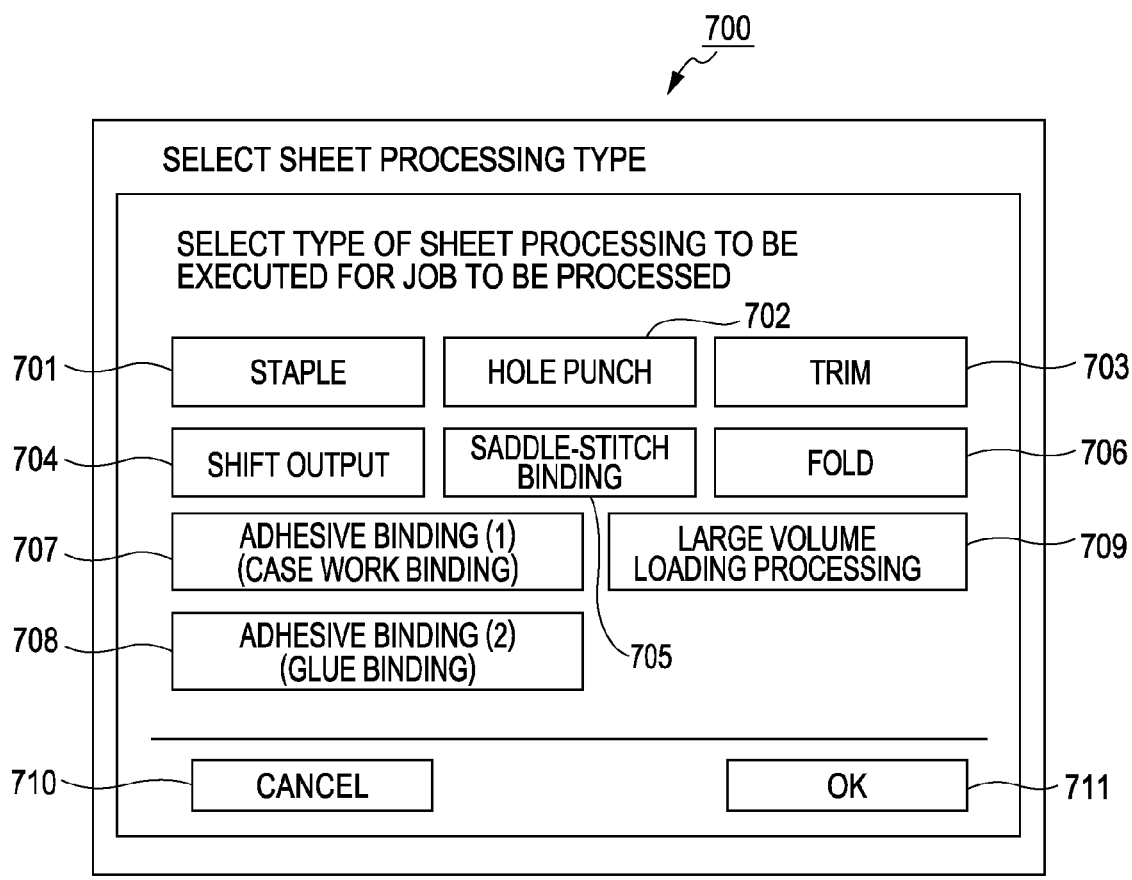
FIG. 7 is a diagram showing a display control example of a user interface unit to be controlled.

(1) stapling processing
(2) hole-punching processing
(3) folding processing
(4) shift output processing
(5) trimming processing
(6) saddle-stitch binding processing
(7) case work binding processing applicable to one example of adhesive binding processing
(8) glue binding processing applicable to another example of adhesive binding processing
(9) large-capacity stacking processing With the user interface control example in FIG. 7, the control unit 205 controls the operating unit 204 so that these nine types of sheet processing are selection options.

The control unit 205 controls the user interface unit so that the sheet processing applicable to a type not executable with the system 1000 is not a selectable option. For example, a sheet processing apparatus which is unusable because, for example, it is broken, is displayed, but in a manner such that it is not selectable by the user.

While executing such control, the control unit 205 obtains configuration information for the sheet processing apparatuses of the printing system 1000. In addition, status information specifying whether an error is occurring in the sheet processing apparatus 200 is obtained.

Note that the system 1000 is also configured to enable receiving a printing executing request of a job to be processed from an external apparatus, such as the PC 103 and 104, and executing a request for sheet processing necessary for such job. When a job is received from an external apparatus, content similar to that illustrated in FIG. 7 is displayed on the display unit (e.g. setting screen of a printer driver) of the external apparatus which is the sending source for printing data by the external apparatuses control unit.

Figure 8A:
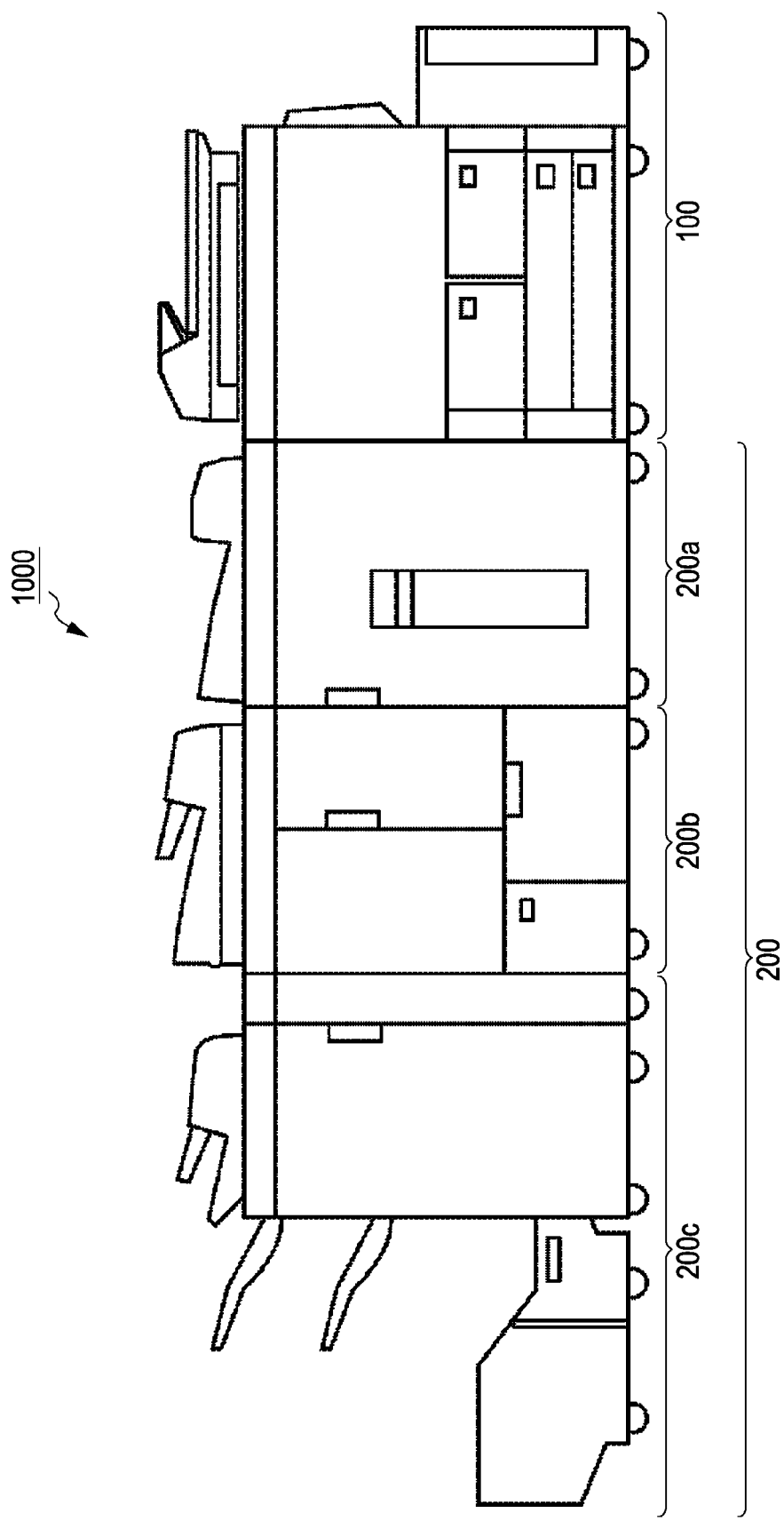
FIG. 8A is a diagram showing a control example of a printing system 1000 to be controlled.

FIG. 8A is an example wherein the system 1000 has three inline type sheet processing apparatuses in the sequence of large-capacity stacker 200a, adhesive binding apparatus 200b, and saddle-stitch binding apparatus 200c.

With the present example, the large-capacity stacker 200a is a sheet processing apparatus which can stack a large number of sheets (e.g. 5000 sheets) of the sheets from the printer unit 203.

The adhesive binding apparatus 200b is a sheet processing apparatus which can execute case work binding processing requiring adhesive processing of the sheets in the event of adding a cover sheet to one bundle worth of sheets printed with the printing unit 203. The adhesive binding apparatus is also called case work binding apparatus since this is a sheet processing apparatus which can execute at least case work binding processing.

The saddle-stitch binding apparatus 200c is a sheet processing apparatus which can selectively execute stapling processing, hole-punching processing, trimming processing, shift output, saddle-stitch binding processing, and folding processing as to the sheets from the printer unit 203.

With the present embodiment, the control unit 205 registers various types of system configuration information relating to the sheet processing apparatuses as management information required for the various types of control in a specified memory. For example, in the case that the system 1000 is a system configuration such as that shown in FIG. 8A, the control unit 205 registers the following information in the HDD 209:

Information 1: Apparatus configuration information for confirming with the control unit 205 that the system 1000 has an inline type sheet processing apparatus.

Information 2: Number-of-units information for confirming with the control unit 205 that the system 1000 has three inline type sheet processing apparatuses 200.

Information 3: Inline sheet processing apparatus type information for confirming with the control unit 205 that the system 1000 has a large-capacity stacker 200a, adhesive binding apparatus 200b, and saddle-stitch binding apparatus 200c.

Information 4: Information for the control unit 205 to be able to specify the sheet processing which is executable with the system.

Information 5: Information for confirming with the control unit 205 that the above-described three sheet processing apparatuses are connected to the printing apparatus 100 as a cascade connection in the order of large-capacity stacker 200a, adhesive binding apparatus 200b, and saddle-stitch binding apparatus 200c.

The various types of information in Information 1 through Information 5 are registered in the HD 209. Also, the control unit 205 uses this information as decision material information required for job control as described below.

An example will be given below with the above-described configuration as a premise of what control the control unit 205 will execute.

Figure 8B:
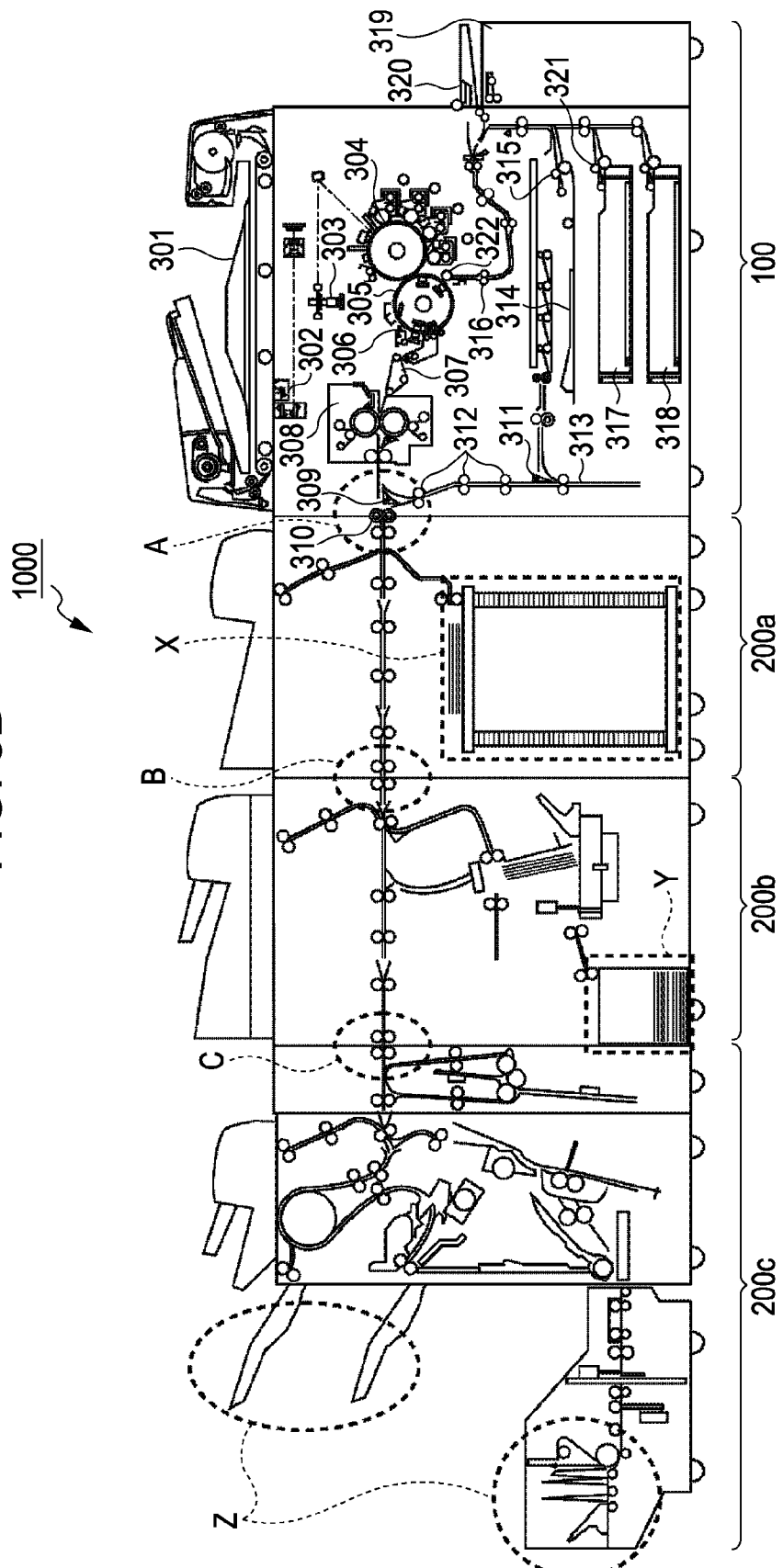
FIG. 8B is a diagram showing a control example of a printing system 1000 to be controlled.

For example, in the case that the system 1000 is the system configuration in FIGS. 8A and 8B, the control unit 205 recognizes that the above-mentioned nine types of sheet processing are all executable with the system based on the decision material of Information 1 through Information 5. Also, based on the recognition results, the control unit 205 controls a user interface unit so that the total nine types of sheet processing shown in display 700 are all selection options.

For example, in the case that the user selects the staple key 701 in FIG. 7, the stapling processing is executed with the saddle-stitch binding apparatus applicable to the sheet processing apparatus 200c in FIG. 8A.

Thus, the control unit 205 enables an execution request for sheet processing desired by a user to be received from selection options corresponding to sheet processing executable with a sheet processing apparatus of the system 1000.

The control unit 205 also responds to a printing execution request of a job to be processing via the user interface unit provided with the present embodiment, and causes the printing processing needed for the job with the printer unit 203.

Further, the control unit 205 executes control as described below with the system 1000.

For example, system 1000 is connected in the order of printing apparatus 100→large-capacity stacker 200a→adhesive binding 200b→saddle-stitch binding 200c as shown in FIG. 8A. The state within the system configuration inner unit in this case is a configuration such as shown in FIG. 8B.

FIG. 8B is an overall apparatus cross-sectional view of the printing system 1000 in the case that the printing system 1000 configuration is the system configuration in FIG. 8A. Also, the apparatus configuration in FIG. 8B corresponds to the apparatus configuration in FIG. 8A.

As illustrated by the apparatus inner configuration of FIG. 8B, the sheets printed with the printer unit 203 of the printing apparatus 100 are configured to be capable of being supplied into the various sheet processing apparatuses. Specifically, the various sheet processing apparatuses have a sheet conveyance path which can convey sheets via point A, point B, and point C within the apparatus.

The various inline type sheet processing apparatuses which have a function to receive sheets from the apparatus is the previous stage connected before the apparatus itself and sends the sheets to the apparatus of the later stage connected behind the apparatus itself, even if the sheet processing executable with the apparatus itself is not necessary for the job to be processed.

With the system configuration as described above, for example, when the printing system 1000 is the system configuration shown in FIGS. 8A and 8B, the control unit 205 executes the control exemplified below as to the job wherein a printing executing request is received from the user.

For example, a job to be processed which has received a printing executing request from the user with the system configuration in FIGS. 8A and 8B is a job requiring sheet processing with the large-capacity stacker 200a after printing processing (ex stacking processing). Here, such a job is called a "stacker job".

In the case of processing the stacker job with the system configuration in FIGS. 8A and 8B, the control unit 205 causes the sheet of the job subjected to printing with the printing apparatus 100 to pass through point A in FIG. 8B, and executes sheet processing with the large-capacity stacker 200a.

Further, the control unit 205 holds the printing results of the stacker job subjected to sheet processing (ex stacking processing) with the large-capacity stacker 200a in a output destination X within the large-capacity stacker 200a shown in FIG. 8B without being conveyed to other apparatuses (e.g. a apparatus at a later stage).

The printed material of the stacker job held in the output destination X of the FIG. 8B is configured to be removable from the location of the output destination X by the operator. A series of controls executed by the control unit 205 in the case that the printing system 1000 is the system configuration in FIGS. 8A and 8B is applicable to the control example of FIG. 8B (case 1).

On the other hand, the job to be processed which received a printing execution request from the user with the system configuration in FIGS. 8A and 8B can be a job requiring sheet processing with the adhesive binding apparatus 200b (e.g. case work binding processing) after printing processing. Here such a job is called "adhesive binding job".

The adhesive binding job is printed with the printing apparatus 100, passes through point A and point B in FIG. 8B, is subjected to sheet processing with the adhesive binding apparatus 200b, and is held in an output destination Y within the adhesive binding apparatus 200b shown in FIG. 8B.

A series of controls executed by the control unit 205 in the case that the printing system 1000 is the system configuration in FIGS. 8A and 8B is applicable to the control example of FIG. 8B (case 2).

In another example, a job to be processed which received a printing execution request from the user with the system configuration in FIGS. 8A and 8B is a job requiring sheet processing with the saddle-stitch binding apparatus 200c (e.g.

saddle-stitch binding processing) after printing processing. Here such a job is called "saddle-stitch binding job".

The saddle-stitch binding job is printed with the printing apparatus 100, passes through points A through C in FIG. 8B, and is subjected to sheet processing with the saddle-stitch binding apparatus 200c.

In the case that the printing system 1000 is the system configuration in FIGS. 8A and 8B, a series of controls executed with the control unit 205 is applicable to a control example in FIG. 8B (case 3).

Note that the system configuration information is information as to whether there is an inline finisher, and in the case there is an inline finisher, the information as to the number of such apparatuses and the capability information of such apparatuses. Also, in the case that there are multiple inline finishers, the connection sequence information is also applicable to system configuration information.

Thus, as illustrated in FIGS. 8A and 8B, the control unit of the printing system 1000 executes various types of control corresponding to each system configuration status (number of connected inline sheet processing apparatuses or connection sequence thereof) of the system 1000 with the system 1000.

As one example of the need for flexibly changing the connection sequence and number of inline sheet processing apparatuses, consider a system taking into consideration the existence of a POD business purchasing the system 1000, where the POD business wants to perform large-capacity stacking processing while case work binding processing may not be necessary.

Next, a specific example of an internal configuration of the various types of inline type sheet processing apparatuses which can be in the system 1000 as exemplified in FIGS. 8A and 8B will be described individually for each sheet processing apparatus.

Internal Configuration of Large-Capacity Stacker

Figure 9:
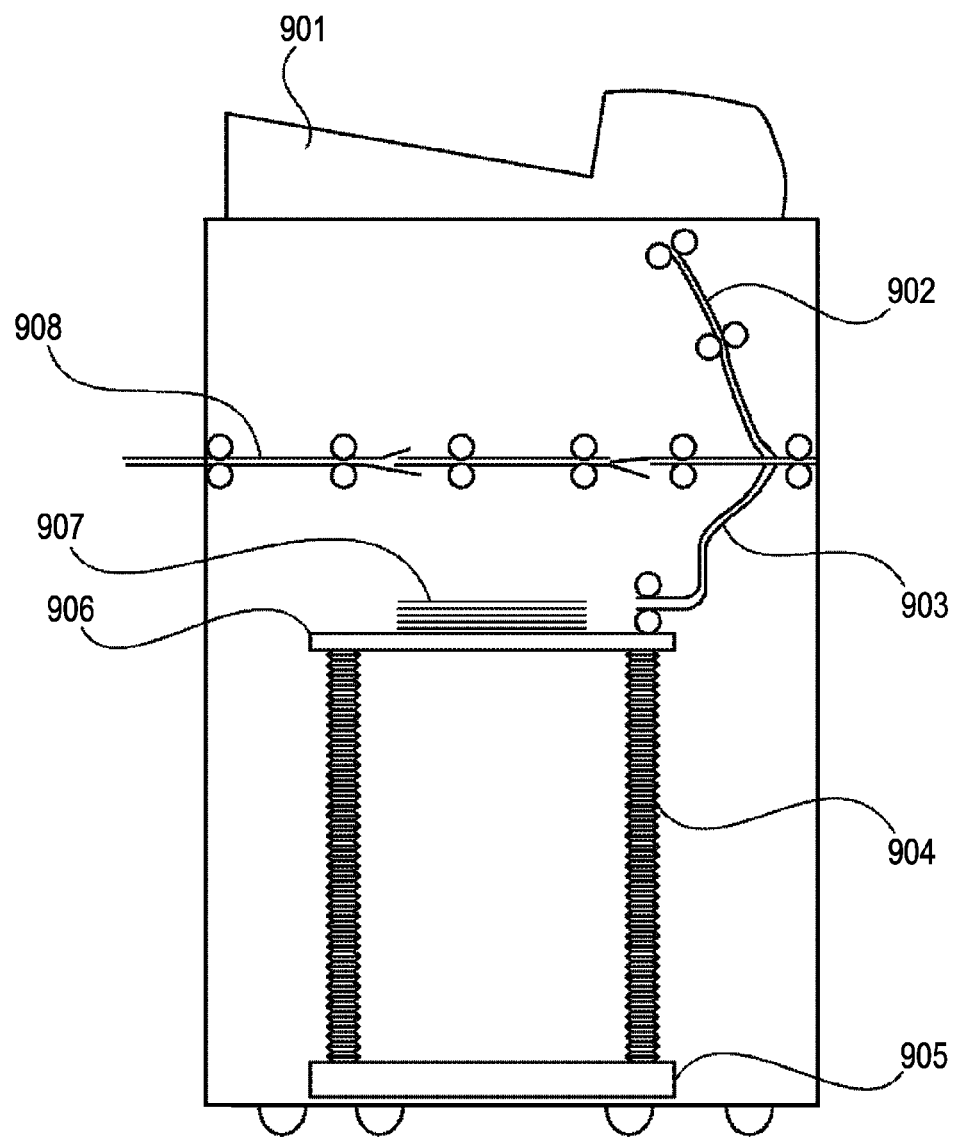
FIG. 9 is a diagram showing an inner configuration example of an inline finisher to be controlled.

FIG. 9 shows an example an inner configuration cross-sectional diagram of the large-capacity stacker 200a. The inner portion of the large-capacity stacker has three conveyance paths. As an example thereof, the large-capacity stacker 200a has a straight path 908, escape path 902, and stack path 903, as shown in FIG. 9.

Note that the straight path 908 of the large-capacity stacker 200a and later-described various apparatuses of the adhesive binding apparatus 200b in FIG. 10 has the function to send the sheets received from the apparatus of the previous stage to a apparatus of a later stage, whereby in the present example this is also called a through path in an inline sheet processing apparatus.

The straight path 908 within the large-capacity stacker 200a is a sheet conveyance path for sending the sheets of a job not requiring sheet stacking processing to an apparatus of a later stage. Also, the escape path 902 within the large-capacity stacker 200a is used in the case of outputting without stacking. For example, in the case of performing confirmation work of the output (proof printing), in order to simplify removal from the stacking tray 906, the printed material is conveyed to the escape path 902, and the printed material is removed from the escape path 902. Also, the stack path 903 within the large-capacity stacker 200a is a sheet conveyance path for executing stacking processing as to sheets of a job requiring stacking processing of the sheets with a stacking unit of the apparatus.

For example, system 1000 has the large-capacity stacker 200a shown in FIGS. 8A and 8B. With this system configuration state, the control unit 205 receives an execution request for sheet stacking processing via, for example, key operations of key 709 in FIG. 7, for example. In this case, the control unit 205 performs control so that the sheets are conveyed to the stack path 903 in the large-capacity stacker 200a. The sheets conveyed to the stack path 903 are outputted to the stacking tray 906.

The stacking tray 906 in FIG. 9 is a stacking unit which is loaded on an expandable stay 904. A shock absorber is attached to the joined portions with the stacking tray 906. The control unit 205 performs control to use the stacking tray 906 and execute stacking processing of printed sheets of a job to be processed with the large-capacity stacker 200a. Below the expandable stay 904 is a cart 905, wherein the stack output loaded on the cart 905 can be carried to another off-line finisher using a handle (not shown) attached to the cart 905.

When the front door of the stacker unit is closed, the expandable stay 904 rises to an upper portion wherein stacking output is easily stacked, and when the front door is opened, the stacking tray 906 is arranged to be lowered.

As to the stacking method of the stacking output, flat stacking or shifted stacking may be performed, whereby flat stacking stacks constantly in the same position. Shifted stacking shifts in increments of each predetermined numbers of copy or in increments of jobs, front and back, and is a method to create divisions in the output to simplify handling of the output.

Thus, the large-capacity stacker 200a, which is permitted to be used as an inline type sheet processing apparatus with the system 1000, is configured to enable executing of multiple types of stacking methods when executing stacking processing of the sheets from the printer unit 203. The control unit 205 controls various types of operations as to the apparatuses.

Internal Configuration of Adhesive Binding Apparatus

Figure 10:
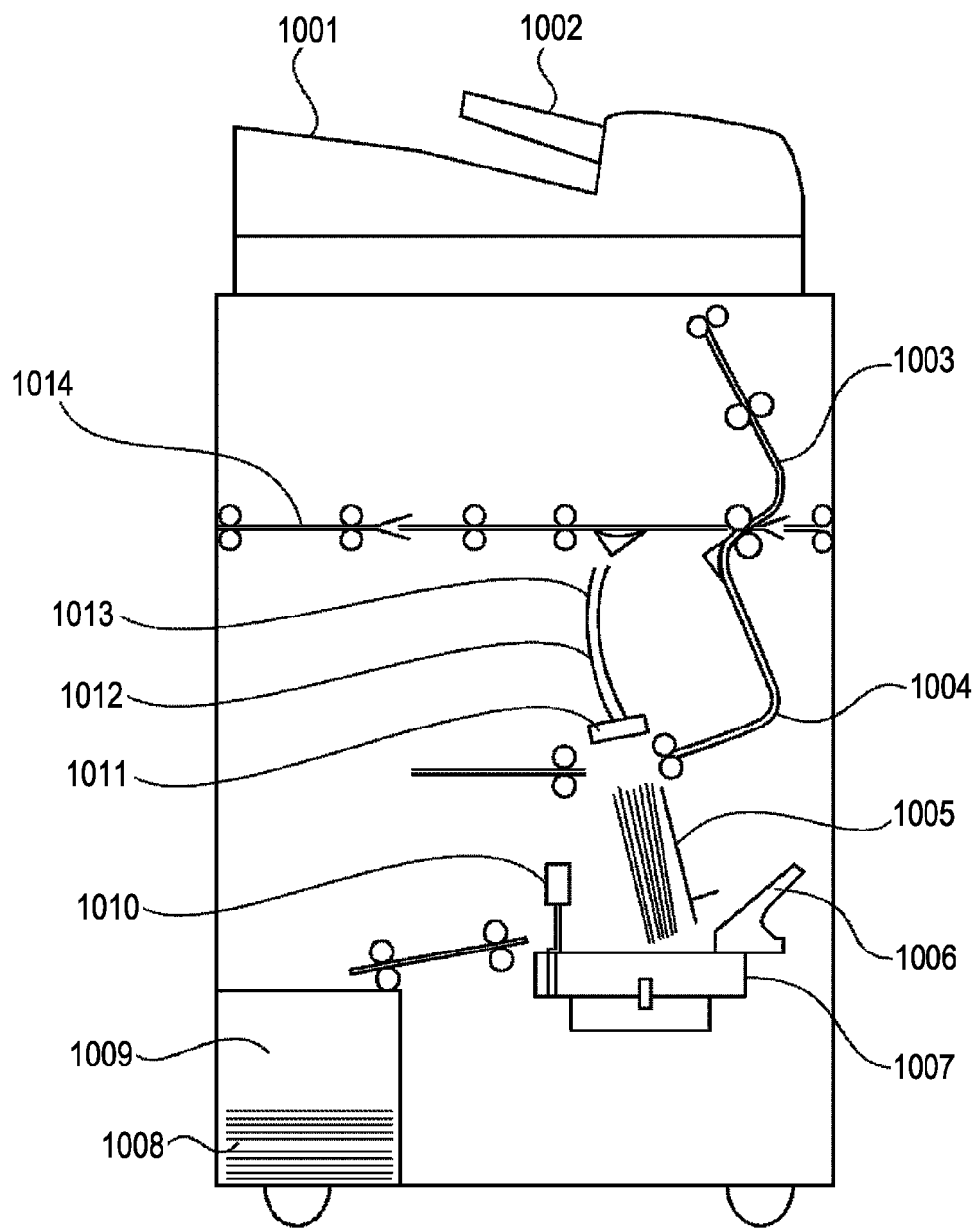
FIG. 10 is a diagram showing an inner configuration example of an inline finisher to be controlled.

FIG. 10 shows an example an inner configuration cross-sectional diagram of the adhesive binding apparatus 200b.

The adhesive binding apparatus 200b has a straight path 1014, book block path 1013, and cover path 1004. The straight path 1014 (through path) within the adhesive binding apparatus 200b is a sheet conveyance path having a function to send the sheets of a job not requiring adhesive binding processing with an adhesive binding unit to a downstream apparatus.

A CPU (not shown) of the adhesive binding apparatus 200b notifies the control unit 205 of the sheet detecting information from each sensor for performing data communication with the control unit 205. The sheet detecting information includes conveying status or jams of the sheets within the adhesive binding apparatus 200b. In the case that other sheet processing apparatuses are connected between the sheet processing apparatus and printing apparatus 100 in a cascade connection as the configuration of the printing system, the sensor information of the adhesive binding apparatus 200b is communicated to the control unit 205. Thus, a configuration unique to the inline finisher is created.

The book block path 1013 and cover path 1004 within the adhesive binding apparatus 200b are sheet conveyance paths to create case work binding printed material 1008.

For example, the printer unit 203 executes printing processing of the printing data to be the main writing as case work binding printing processing. The binding apparatus executes processing to wrap the main writing portion ("book block") in the output material worth one bundle of printed sheets with one cover sheet. In this event, the sheet to serve as the cover is conveyed via the cover path 1004, and the sheets to serve as the book block are conveyed via the book block path 1013.

Processing will be described wherein the control unit 205 receives a case work binding processing execution request from the user. For example, the binding apparatus accumulates sheets printed with the printer unit 203 in the stacking unit 1012 sequentially via the book block path 1013, and conveys a cover sheet needed for this job via the cover path 1004.

Thus, with an inline type sheet processing apparatus to be controlled with the control unit 205, adhesive binding processing called case work binding processing is executed.

The sheet for the cover of the case work binding may be conveyed from the inserter tray 1001 of the inserter 1002 of the adhesive binding apparatus 200b. In this case, the cover sheet is a pre-printed sheet whereupon cover data is already printed. Also, the sheets subjected to image printing with the printing apparatus 100 itself are cover sheets. These cover sheets are conveyed to the cover path 1004, and are temporarily held at the lower portion of the stacking unit 1012.

In parallel to this operation, adhesive processing is executed as to the book block made up of multiple sheets already subjected to printing of the main writing, which are stacked on the stacking unit 1012. The binding apparatus sends out the book block being pressed downward, so the book block wrapped in a cover is disposed on a rotational table 1007 following a guide 1005.

Thereafter, the fore-edge is trimmed with a cutter 1010. Next, the rotational table 1007 is rotated 90 degrees, alignment is performed with a side justifying unit 1006, and the top is trimmed. Further, the rotational table 1007 is rotated 180 degrees, alignment is performed with the side justifying unit 1006, and the bottom is trimmed.

After trimming, alignment is made further, the completed book block wrapped in a cover is placed in a basket 1009, and after the adhesive is sufficiently dried, the finished case work binding bundle can be removed.

Thus, the adhesive binding apparatus 200b has an adhesive unit 1011 to execute adhesive binding processing as to the sheets of a job to be processed, having an execution request from a user for adhesive binding processing along with printing execution request.

Also, the printing system 1000 is configured to enable receiving a printing executing request and sheet processing executing request of a job to be processed from the information processing apparatus applicable to an example of the external apparatus. Hereafter, an example will be described in the case of using the printing system 1000 from the host computer (PC 103 and 104).

Figures 11A, 11B:
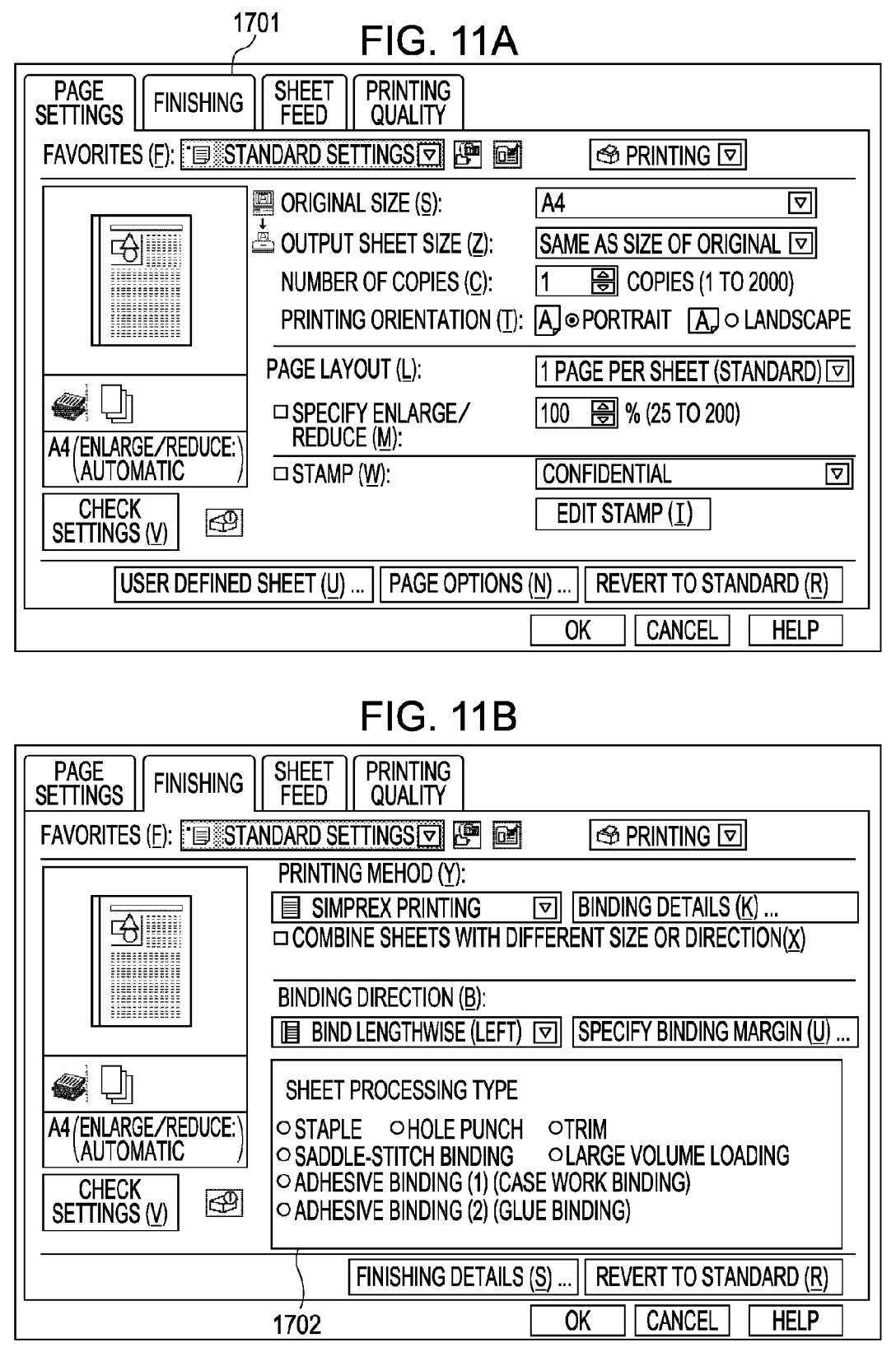

FIGS. 11A and 11B illustrates a printing setting screen displayed on the display unit of the host computer according to the present embodiment.

For example, when the finishing key 1701 on the operating screen in FIGS. 11A and 11B is selected by the user, the printing setting screen displays the screen illustrated in FIG. 11B.

Sheet processing setting item 1702 in FIG. 11B is used by the user to control the type of processing executed with the inline type sheet processing apparatus 200 of the system 1000.

The desired sheet processing is selected by the user via the setting item 1702, and the OK key is pressed on the screen in FIG. 11A. As a result, the host computer associates a command showing the various types of printing conditions set by the user and a series of printing data to be printed as one job, and sends this via the network.

Upon the job from the computer being received by the external interface unit 202 of the system 1000, the control unit 205 controls the job to perform processing based on processing requirements set by the user.

Next, an example of confirmation printing will be described in comparison to test copying.

Figure 12A:
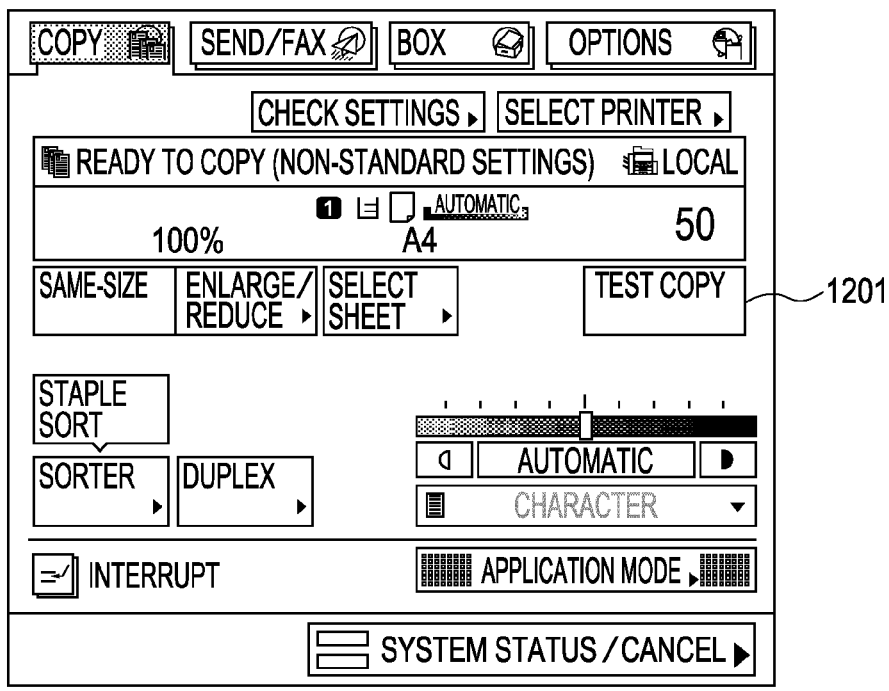
FIG. 12A is a diagram showing a display control example of a user interface unit to be controlled.

Test copying prints one copy only (or specified pages of one copy) in the event of performing copying of multiple copies, and realizes confirmation of the printing results. In the case that the copy tab 601 is selected with the touch panel unit 401, the control unit 205 displays the screen in FIG. 12A. Further, upon the number of print copies (one or more) is input with the key input unit 402 and the sorter is set, the control unit 205 displays a test copy button 1201.

Figure 12B:
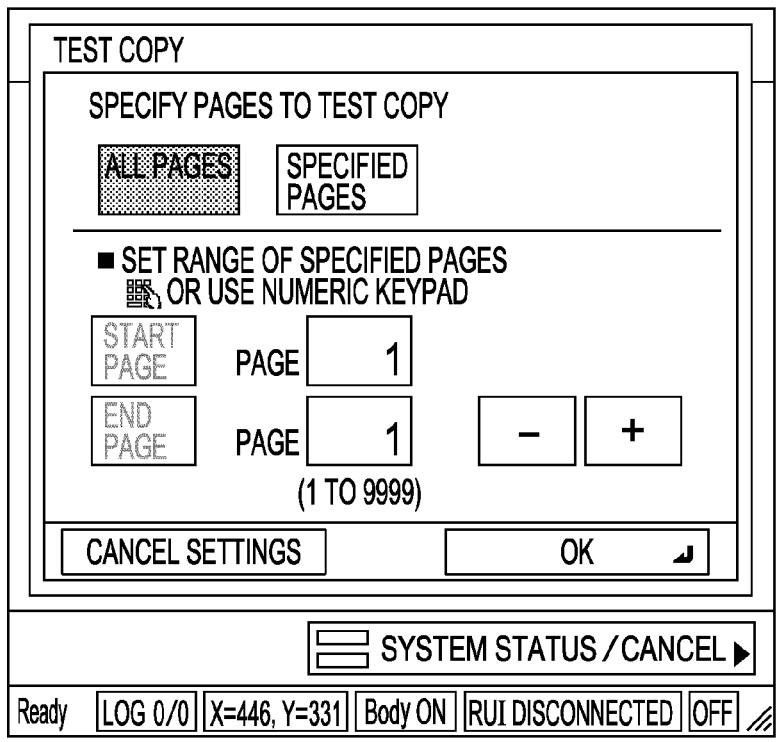
FIG. 12B is a diagram showing a display control example of a user interface unit to be controlled.

Upon the test copy button 1201 being pressed by the operator, the control unit 205 displays the screen in FIG. 12B. With this screen, whether to print all pages for the test copy or to print only specified pages, and in the case of specified pages, the start page and end page, can be specified. Upon the range of test print being set with the present screen and the OK button pushed, the control unit 205 controls the printer unit 203 to execute test printing according to the printing conditions received via the FIG. 12B.

Figure 12C:
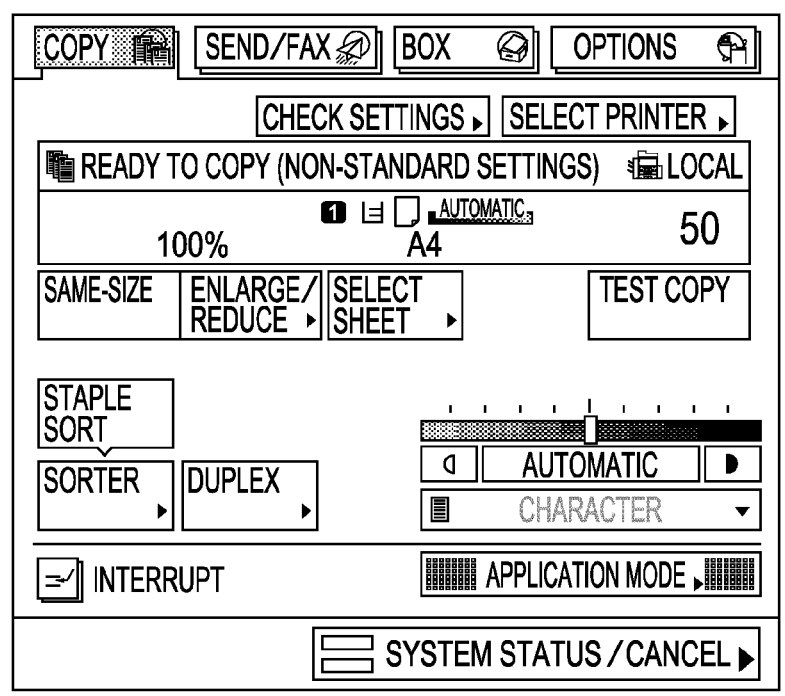
FIG. 12C is a diagram showing a display control example of a user interface unit to be controlled.

Next, upon the test printing completing, the control unit 205 displays the screen in FIG. 12C, and stands by for operations by the operator. In the case of test printing completing, the printer unit 203 goes to a printing operation stopped state. At this time, the operator can perform the actions listed below:

(1) As a result of test printing, in case of no problems, execute main printing.
(2) As a result of test printing, change printing settings and perform test printing again (or execute main printing).
(3) As a result of test printing, stop main printing (cancel).

In the case of stopping (canceling) the printing by the operator, the main printing is not executed. Also, in the case that settings are changed after test printing by the operator, the main printing is executed using the printing conditions after the setting changes and the number of print copies received before test printing executing. Also, in the case that settings are not changed by the operator, main printing is executed. However, the number of print copies is a number of print copies less one copy from the total number of print copies received before test printing.

Next, confirmation printing operations will be described. Confirmation printing is an operation to print one copy or only specified pages during the execution of multiple copies of printing in order to perform confirmation of printing results. The sequence of confirmation printing will be described. In the case that printing is executed with the printer unit 203, the control unit 205 displays the screen shown in FIG. 13A on the touch panel unit 401.

Figure 13A:
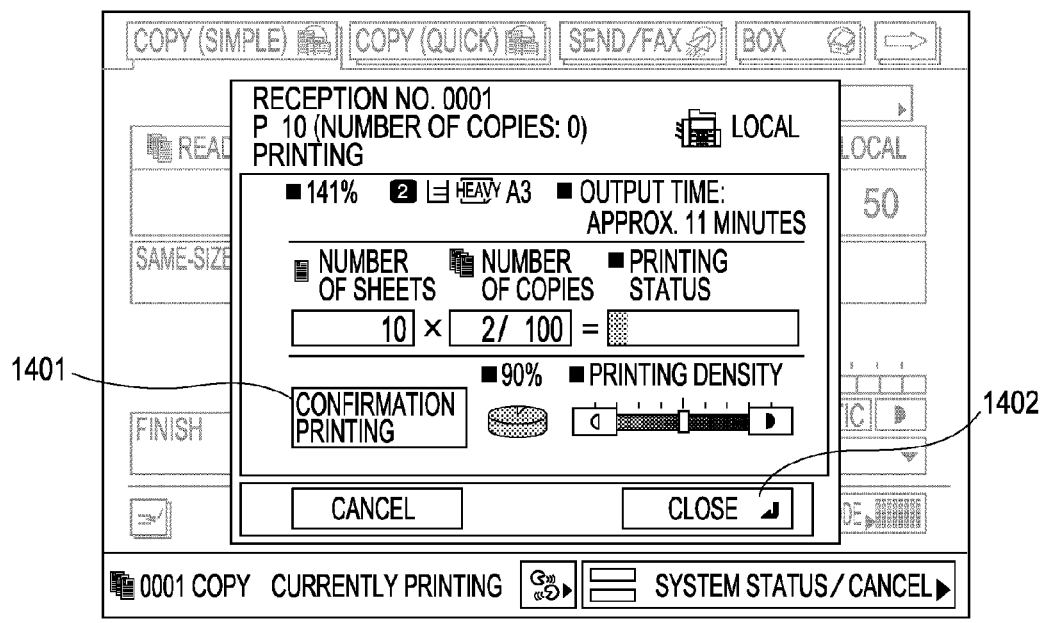
FIG. 13A is a diagram showing a display control example of a user interface unit to be controlled.
Figure 13B:
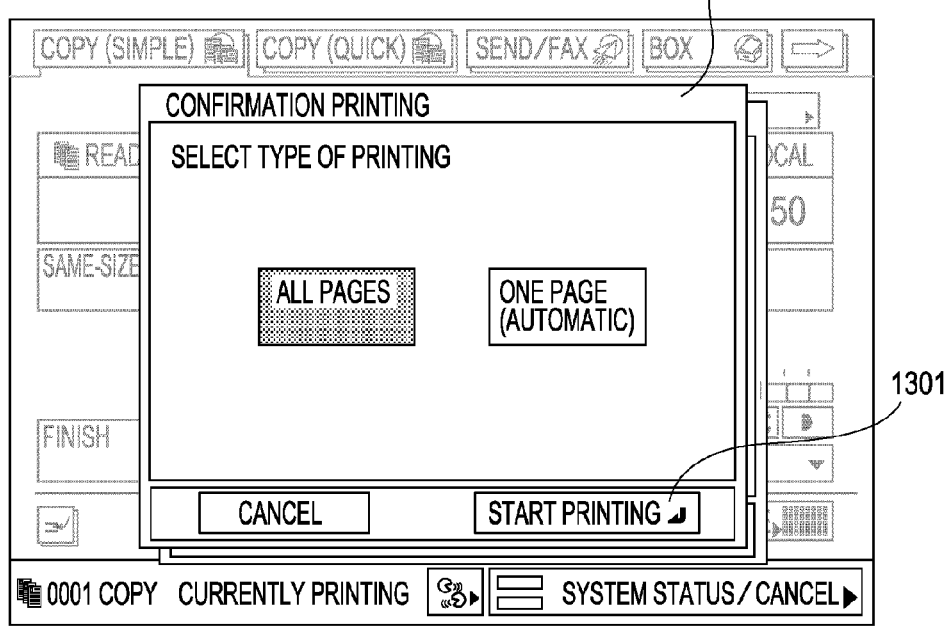
FIG. 13B is a diagram showing a display control example of a user interface unit to be controlled.

Upon a confirmation print button 1401 in FIG. 13A being pressed by the operator, the control unit 205 displays the screen in FIG. 13B. The operator uses the screen in FIG. 13B to select whether to print all pages (one copy) as the confirmation print or print only one sheet (automatically determines which page to print). At this time, the printer unit 203 is executing the main printing, and a message is displayed on the lower portion of the screen in FIG. 13B to indicate that the current status is printing. That is to say, the test printing is executed with separate timing between the test printing and main printing, but the confirmation printing differs in that confirmation printing is executed according to the user instructions during main printing.

The operator uses the screen in FIG. 13B to select the confirmation print area 1302 and presses the start printing button 1301, whereby the control unit 205 causes the printer unit 203 to execute confirmation printing.

Upon the confirmation printing completing, the control unit 205 automatically restarts the printing operation of the main printing, and the screen in FIG. 13A is displayed again. The operator confirms the printing material for confirmation which is printed with the confirmation printing. In the case there is a problem with the printed material, the operator can, for example, instruct the following processing:

(1) Stop (cancel) the automatically restarted main printing.
(2) Temporarily stop the main printing, change printing settings (media, density, and so forth) of the job, and restart the main printing.
(3) Temporarily stop the main printing, perform adjustments unique to each apparatus, and restart the main printing.

In the case of stopping the main printing, upon the operating pressing the close button 1402 on the screen in FIG. 13A, the control unit 205 displays the screen in FIG. 6 again. Upon the operator pressing the system status/stop button 617 button on the screen in FIG. 6, the control unit 205 displays the screen in FIG. 14. The operator selects the job currently being executed with the screen in FIG. 14, and presses the stop button, whereby the control unit 205 stops the printing of the job.

Figure 14:
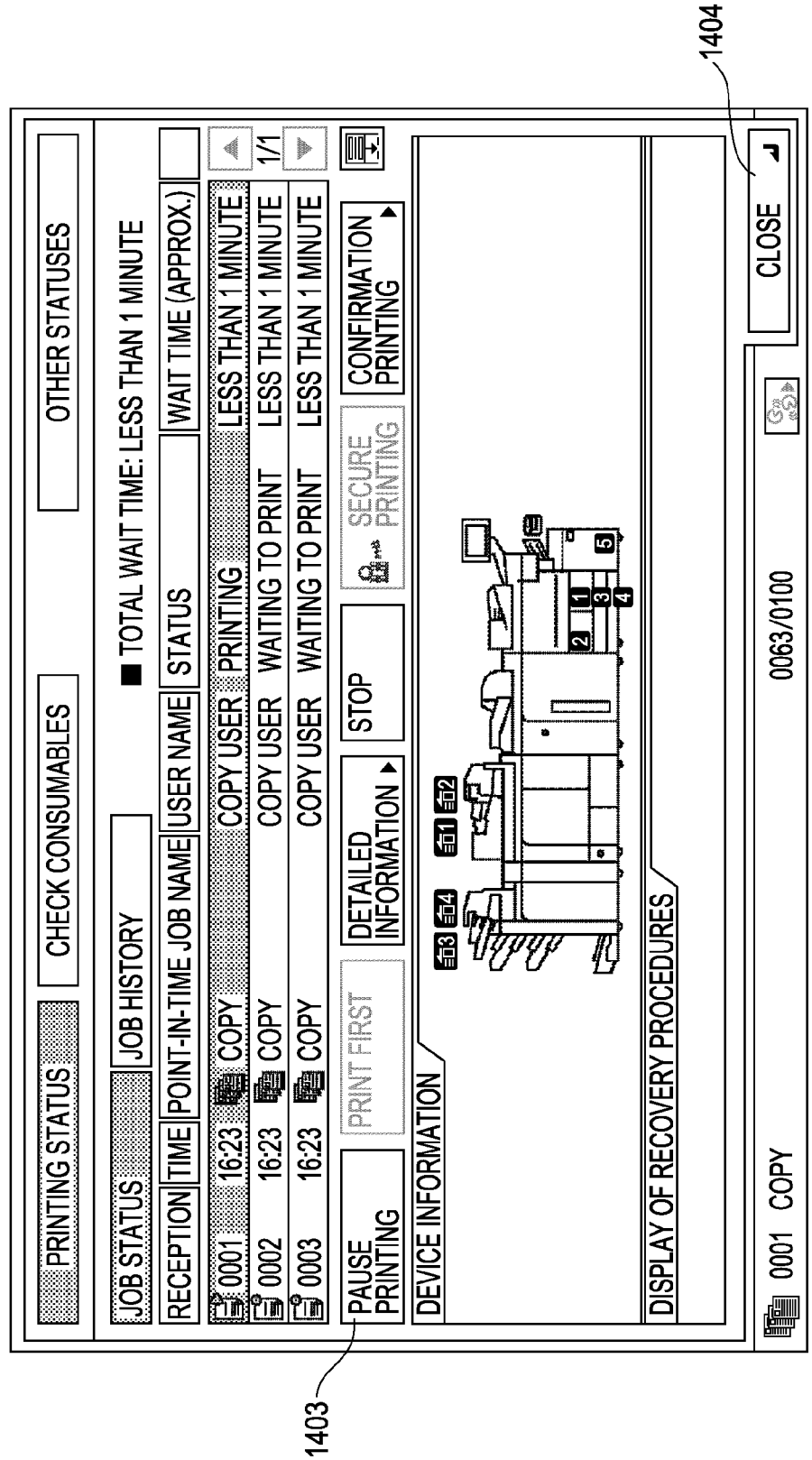
FIG. 14 is a diagram showing a display control example of a user interface unit to be controlled.

In the case of changing printing settings, the operator selects a job currently being executed with the screen in FIG. 14, and presses a pause printing button 1403, whereby the control unit 205 temporarily stops the printing of the job. After stopping, the operator presses the close button 1404 to close FIG. 14, whereby the control unit 205 closes the screen in FIG. 14, and the screen in FIG. 6 is redisplayed. The operator changes the sheets with a sheet selection button 615 of the screen in FIG. 6. Also, the density can be adjusted with a density adjusting button 611.

In the case of performing adjustments unique to each apparatus, the operator selects a job currently being executed with the screen in FIG. 14, and presses the pause printing button 1403, whereby the control unit 205 temporarily stops printing of the job. After stopping, the operator presses the close button 1404 to close FIG. 14, whereby the control unit 205 closes the screen in FIG. 14, and the screen in FIG. 6 is redisplayed. The operator presses a user mode key 505 on the screen in FIG. 6, whereby various types of settings can be changed.

Thus, the printing apparatus 100 of the printing system 1000 has both a test copy function as well as a confirmation print function.

With the confirmation print function, confirmation printing processing can be realized during continuous printing operations with the printing system 1000, assuming the printing environment such as a POD. Accordingly, confirmation printing can be executed without decreasing printing performance of main printing.

In the case of executing confirmation printing, the printing apparatus 100 of the printing system 1000 outputs printed material to a separate output unit from the main printing so as not to be mixed in with the printed material of the main printing. Further, even the case of using a set of sheets with a sequence for the printing data to be processed, the printing system 1000 performs control so that the sequence of the set of sheets is not disordered by the confirmation printing.

The sequence of confirmation printing (confirmation printing during copy operations) will be described in detail using the flowchart in FIGS. 17A and 17B. The tab sheets will be described in detail here as an example, but this is not necessarily limited to tab sheets. For example, pre-printed sheets which make up one set by multiple sheets whereupon some information is printed beforehand may be applicable as well.

In step S101, the control unit 205 displays a basic screen (FIG. 12A), and receives the settings of various printing conditions by the operator with key operations (S102). In step S103, the control unit 205 determines whether a printing start request has been made. Upon the operator pressing the start key 503, the control unit 205 detects a printing start request (start key input), and the flow proceeds to step S104.

In step S104, the control unit 205 displays a pop-up of a printing status screen shown in FIG. 13A. Next, in step S105, in the case that a confirmation printing request is received, a print job is stored for a confirmation printing start request in order to restart the main printing after the confirmation printing is ended. Note that the control unit 205 analyzes the print job saves in step S105, whereby the sheets to be used for printing each page for example which is included in the printing data can be specified.

In step S106, the control unit 205 controls the printer unit 203 to execute the printing for the job having received the printing start request. In step S107, the control unit 205 determines whether the main printing of the job is completed.

In the case that the main printing is completed, the control unit 205 closes the printing status pop-up screen in step S108. The printing status pop-up screen can also be manually closed (pressing the close button 1402) by the operator before the main printing is completed. Note that in the present embodiment, the printing started with the printing start request and the printing after the confirmation printing is called the main printing.

If the main printing is not completed in step S107, then in step S109, the control unit 205 determines whether the confirmation print button 1401 has been pressed on the printing status pop-up screen. In the case there is no confirmation print request, the process returns to step S107 in FIG. 17A.

In the case that the confirmation print button 1401 is pressed, then in step S110, the control unit 205 displays a confirmation print selection screen illustrated in FIG. 13B. As a range for confirmation printing, all pages or one page of the job is selectable, but is not limited to this arrangement.

Next, in step S111, the control unit 205 determines whether the confirmation print button 1401 is pressed. If the confirmation print button 1401 is pressed, then flow proceeds to step S112, where the control unit 205 determines whether the pages to be printed using tab sheets exist in the confirmation print range. That is, the control unit 205 functions as a first determining unit to determine whether the sheet to be used for the confirmation page is a specialized sheet (e.g. tab sheet). For example, in the case that the user selects all pages as the type of confirmation printing, the control unit 205 determines whether there are any pages using a tab sheet for the printing job to be processed, whereby the processing in step S112 is realized.

On the other hand, in the case that one sheet (automatic) is selected as the type of confirmation printing, the control unit 205 determines whether the page to be subjected to confirmation printing specified with a timing receiving confirmation printing instructions uses a tab sheet. For example, in the case that instruction for confirmation printing is received during the printing of page 5 in a job with pages 1 through 10, the fifth page is determined to be the page for confirmation printing. Also, in the case that attributes indicating the use of tabs on the header of a print job are included, for example, the control unit 205 may use the attributes to execute determining processing of step S112.

Figure 18:
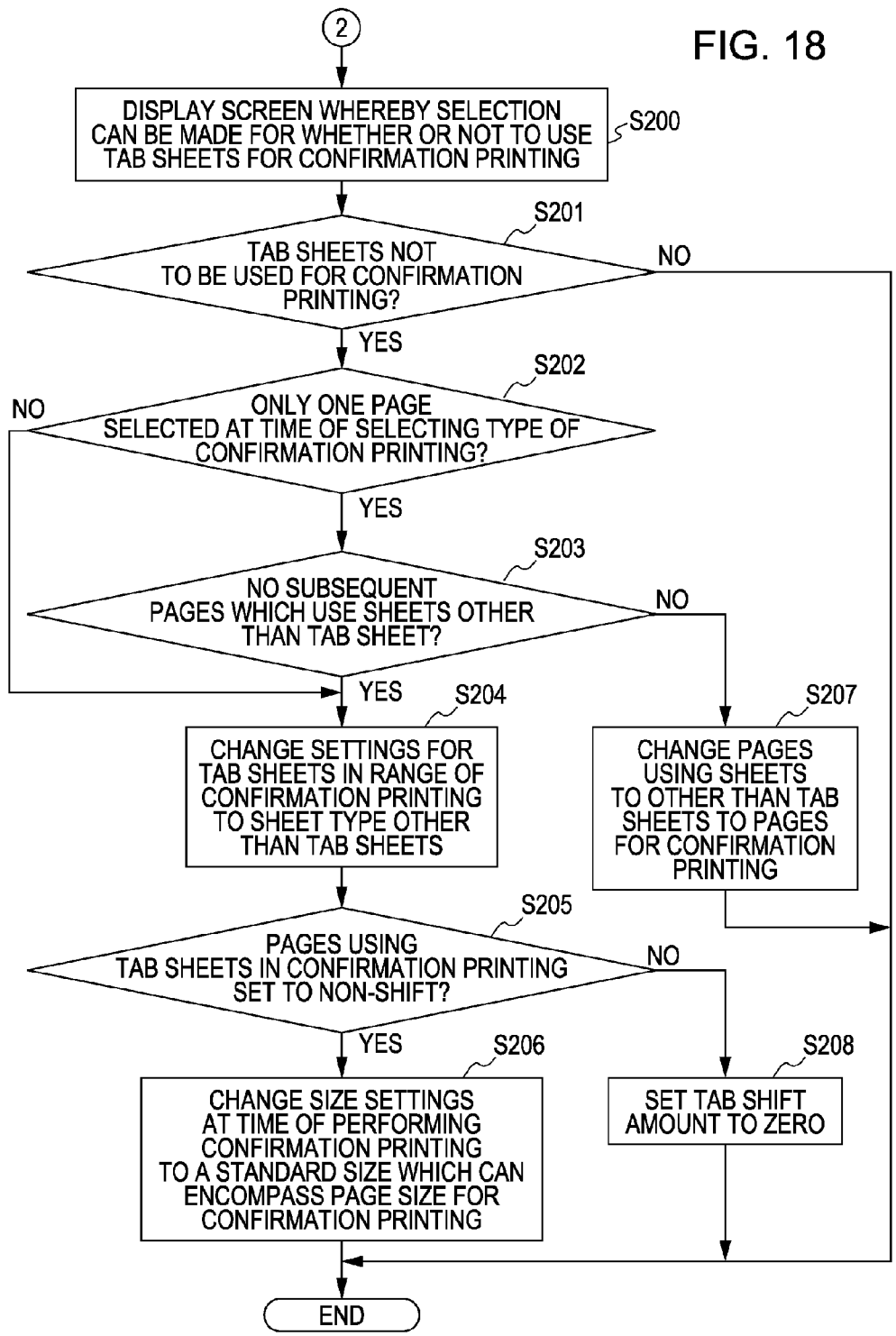
FIG. 18 is a flowchart to describe control.

If it is determined in step S112 that there are no pages using a tab sheet, the flow advances to step S113. If it is determined in step S112 that there is a page using a tab sheet, the flow proceeds to the flowchart illustrated in FIG. 18. FIG. 18 describes control of the confirmation printing including tab sheets.

Figure 16:
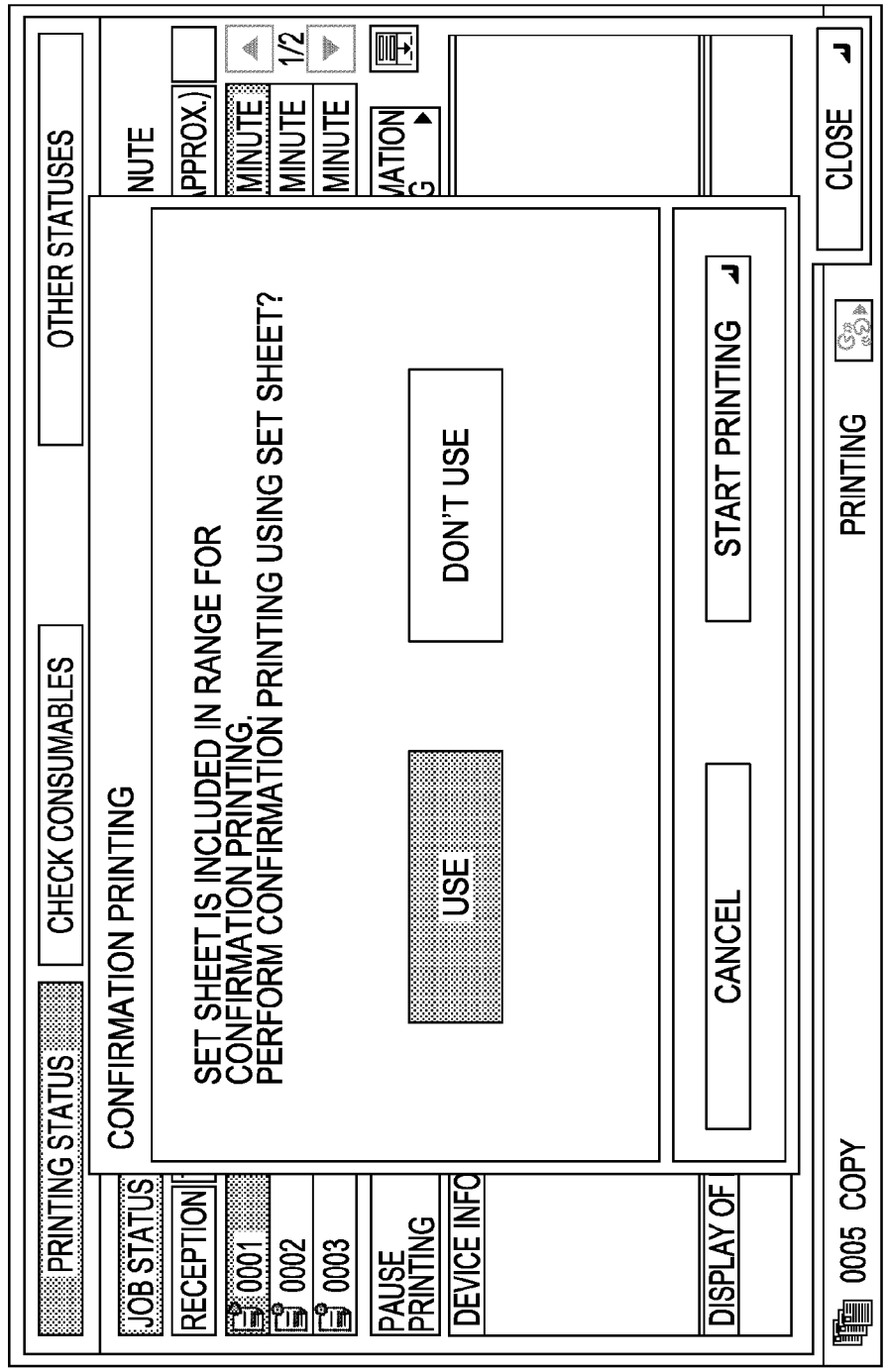
FIG. 16 is a diagram showing a display control example of a user interface unit to be controlled.

In step S200, the control unit 205 displays a screen (FIG. 16) which enables selection of whether to use a tab sheet for confirmation printing. A user can use the screen illustrated in FIG. 16 is used to select confirmation printing which does not use tab sheets as to the pages normally using tab sheets, and to execute confirmation printing of the printing position shifting or color changes which can occur during large-capacity page printings without confusing tab sheets which are more expensive than normal paper. That is to say, the processing content of the confirmation printing can be input.

Next, in step S201, the control unit 205 determines whether to use a tab sheet for confirmation printing according to the instructions input with the tab sheet usage selection screen in FIG. 16.

Figure 17A:
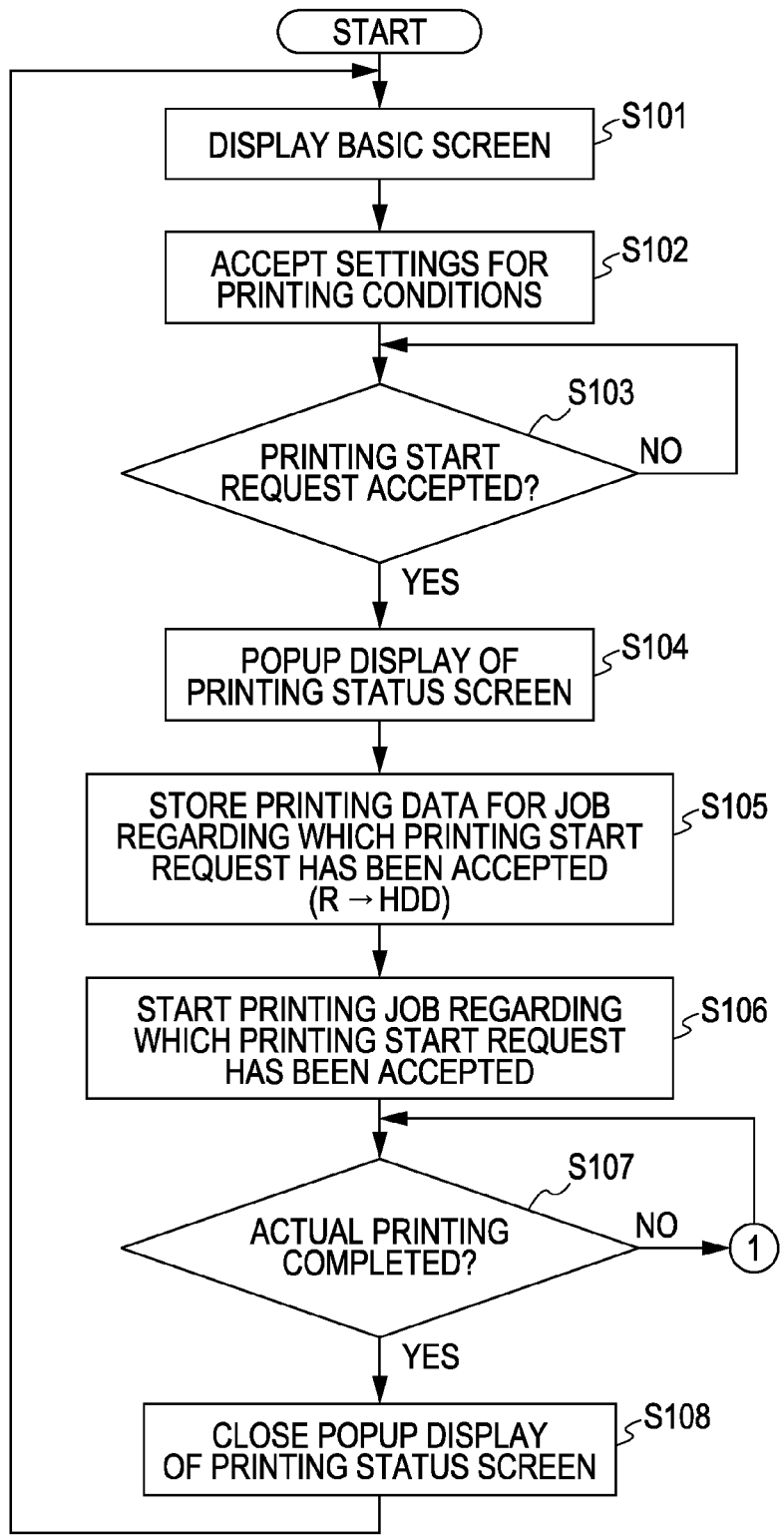
FIG. 17A is a flowchart to describe control.
Figure 17B:
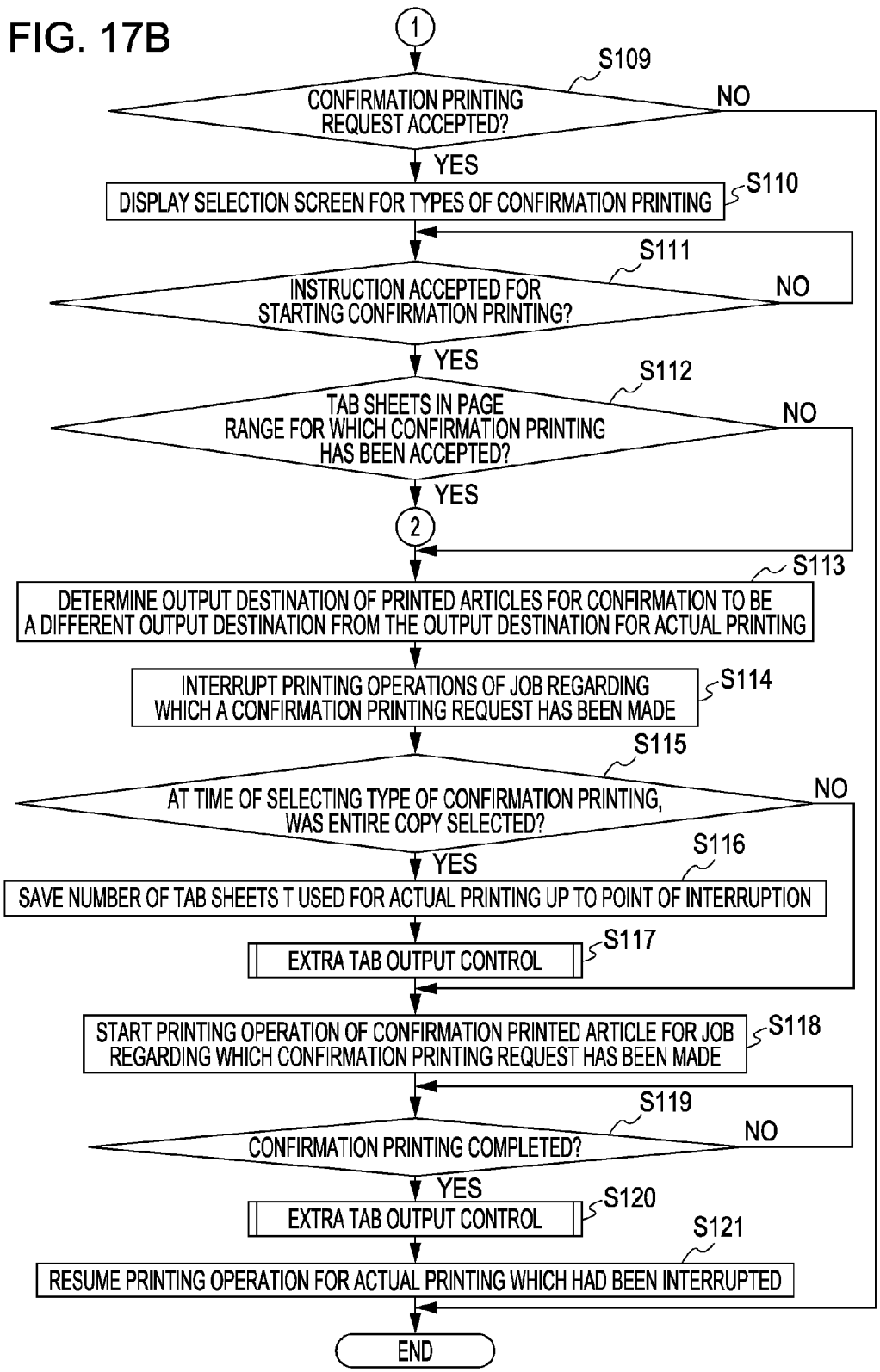
FIG. 17B is a flowchart to describe control.

If using a tab sheet is selected in S201 (S201—No), the process returns to step S113 in FIG. 17B. If not using a tab sheet is selected (S201—Yes), flow proceeds to step S202, where the control unit 205 determines whether one page has been selected as the range when selecting the range for confirmation printing in FIG. 13B.

If, in step S202, one page is determined to be selected (S202—Yes), flow proceeds to step S203, where the control unit 205 determines whether there are pages which use sheets other than tab sheets with the main printing job after the page for confirmation printing has been determined with the confirmation printing starting instructions. That is, the control unit 205 functions as a second determining unit to determine whether the pages following the page using a tab sheet serving as the page currently subjected to confirmation printing include any pages not using a tab sheet which is an example of a specialized sheet. Note that the determining processing in step S203 can be realized by analyzing the printing data saved in step S105 of FIG. 17A.

If, in step S203, it is determined that there are pages using sheets other than tab sheets (S203—No), flow proceeds to step S207, where the control unit 205 changes the pages using sheets detected to be using other than tab sheets to confirmation printing pages. Consequently, even if the pages for confirmation printing are pages which use tab sheets, the pages which do not use tab sheets thereafter are changed to pages for confirmation, whereby printed material content can be confirmed during the printing processing without unnecessarily consuming tab sheets.

If it is determined in step S203 that no subsequent pages using sheets other than tab sheets, or if it is determined in step S202 that there is more than one page selected, then in step S204, the control unit 205 changes the printing settings to print using sheets (e.g. normal paper) which differs from tab sheets for the pages using tab sheets within the confirmation print range.

Next, in step S205, the control unit 205 determines whether the pages using a tab sheet within the confirmation print range has the settings for applying shifting processing. Here, settings for applying shifting processing are settings to realize printing as to the tab ear of the tab sheet by shifting the image data created in the same image size as a standard size such as A4 towards the tab ear side of the tab sheet by only a specified shifting amount.

On the other hand, settings for non-shifting processing are settings to realize printing as to the tab ear of the tab sheet by creating an image size larger than the standard size by the ear amount, and printing on the tab sheet without shifting the image data. Note that determining processing in step S205 can be realized by analyzing the printing data saved in step S105.

In step S205, if it is determined that the shifting type tab sheet settings are made (S205—No), then in step S208, the control unit 205 changes the shifting amount to zero. Consequently, data can be printed on a standard sheet such as A4 or LTR which is to be printed on the tab portion. If it is determined in step S205 that non-shift type tab sheet settings are made (S205—Yes), then in step S206, the control unit 205 changes to a sheet size wherein printing can be performed for an image larger by the amount of the tab ear. For example, in the case that non-shifting type tab sheet settings wherein an image size larger by the tab ear on A4 is set, the control unit 205 changes the amount of the tab ear portion to a printable A3.

Thus, the present embodiment addresses a case wherein settings for sheet size are changed to encompass the image size larger by the amount of the tab ear. However, the present embodiment is not limited to this case. For example, sheet storing information which is set in the sheet storing unit of the printing apparatus 100 is obtained, and the sheet closest to the tab sheet from the sheet sizes already set can be automatically selected.

An arrangement may also be made wherein, if there is no sheet size which can encompass the image size which is larger by the amount of the tab ear in the sheet storing information, the image size is reduced, or a portion of the image data is deleted, to match the size existing in the sheet storing information, and changed to settings for the sheet sizes existing in the sheet storing information.

Turning back to FIG. 17B, in step S113, the control unit 205 determines the output destination of the confirmation printing with consideration for the output destination of the main printing so that the output destinations are not the same. Next, in step S114, the control unit 205 stops the main printing (executing with the printer unit 203) of the job requesting confirmation printing, and in step S115, determines with the confirmation print type selection screen whether the confirmation print range is all pages. If, in step S115, it is determined that the confirmation print range is all pages (S115—Yes), flow proceeds to step S116, where the control unit 205 stores the number T of tab sheets used in the main printing from printing start to printing pause in the HDD 209.

Next, the flow advances to step S117, where the control unit 205 performs excess tab output control as described below. After finishing excess tab output control, the flow proceeds to step S118, where the control unit 205 controls the printer unit 203 to control printing of the confirmation print pages. Then, in step S119, the control unit 205 determines whether the confirmation printing is completed.

If in step S119 it is determined that confirmation printing is completed, the flow advances to step S120, where the excess tab output control is performed. Next, step S121 the control unit 205 reopens the paused printing of the main printing. The flow then returns to step S107 in FIG. 17A. That is, after the confirmation page is printed for confirmation upon the reopening of the main printing, the control unit 205 uses the same type of sheet as the sheet used for confirmation printing and prints the confirmation pages.

Figure 19:
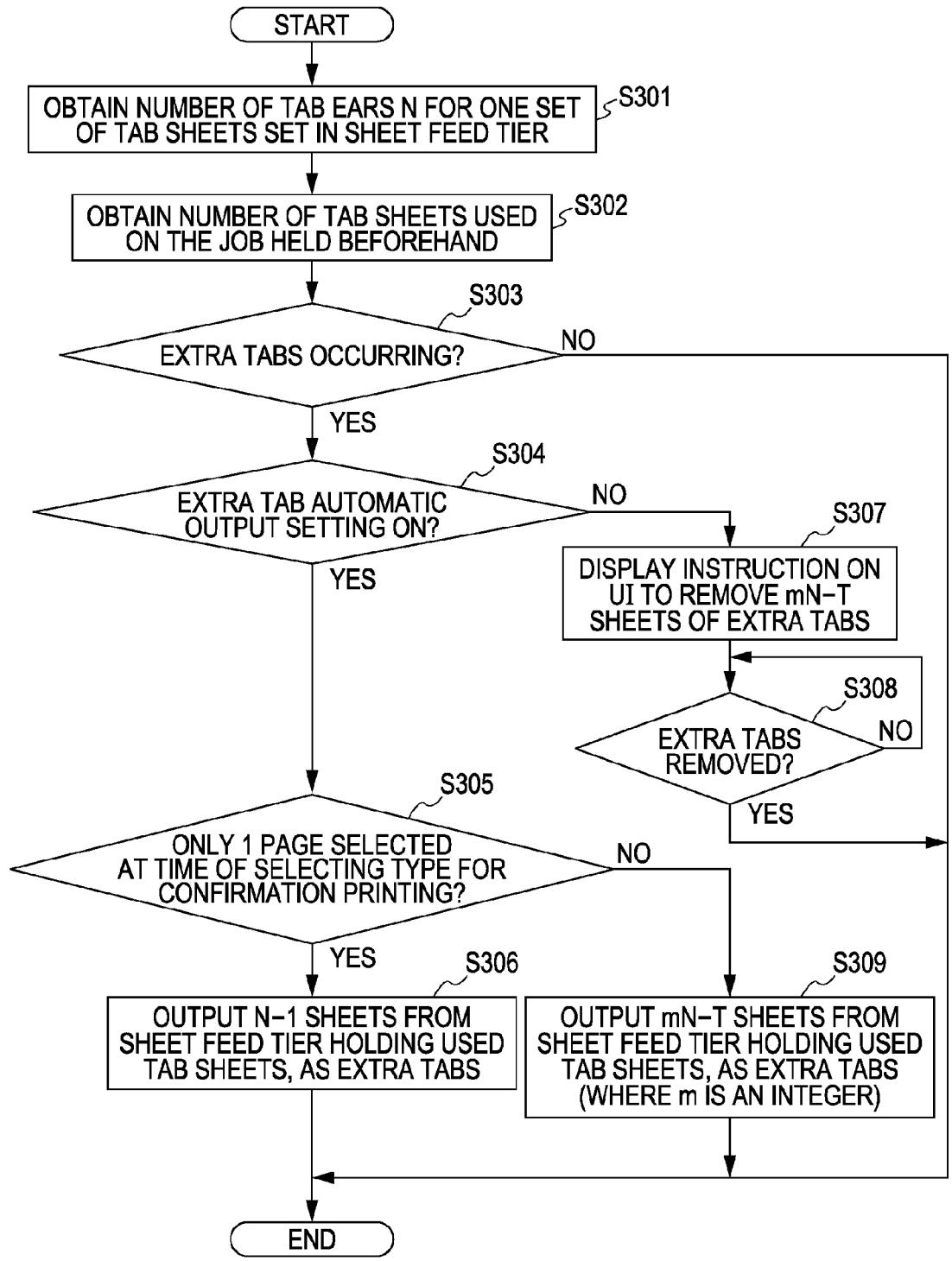
FIG. 19 is a flowchart to describe control.

The sequence of excess tab output control in step S117 and step S120 will be described in further detail with reference to the flowchart in FIG. 19.

Figure 15:
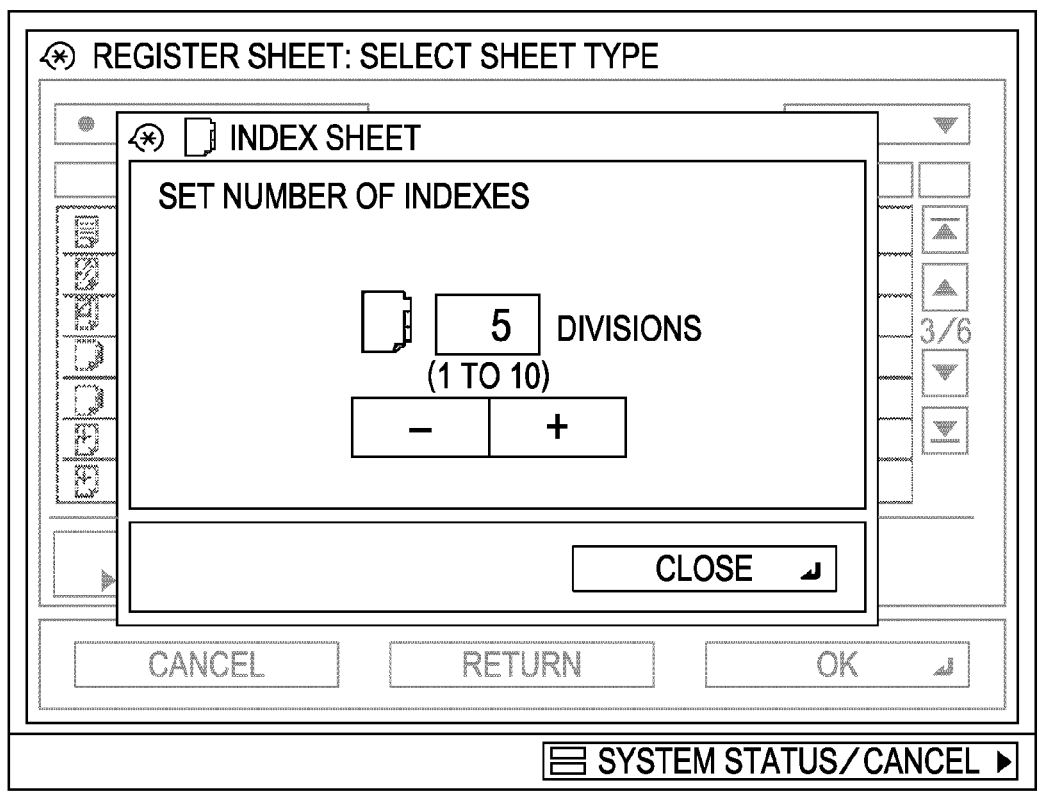
FIG. 15 is a diagram showing a display control example of a user interface unit to be controlled.

First, in step S301, the control unit 205 obtains N number of tab sheets worth one set which is set in the sheet supply of the printing apparatus 100. The settings for the number of tab ears for one set of tab sheets can be set beforehand with a screen as illustrated in FIG. 15. Also, in the case that tab sheets are not set in the sheet supply, the number N of tab ears worth one set is 0.

Next, in step S302, the control unit 205 obtains the number T of tab sheets used in the job stored in the HDD 209 in S116. In the case that tab sheets are not used, the number T of tab sheets used is 0.

Next, in step S303, the control unit 205 determines whether excess tabs have occurred. Specifically, tab sheets are used for jobs during printing, and in the case that an integer multiple of N is not equal to T when the number of tab ears N worth one set and the number T of tabs used are compared, determination is made that excess tabs have occurred. In other words, in the case that tab sheets worth the number of sheets matching (N tab ears×integer) are used, determination is made that excess tabs have not occurred.

If it is determined that excess tabs have not occurred, the flow ends. If it is determined that excess tabs have occurred, then in step S304, the control unit 205 determines whether the excess tab automatic output setting is set to ON. If it is set to ON, then the flow proceeds to step S305, else the flow proceeds to step S307.

Figure 20:
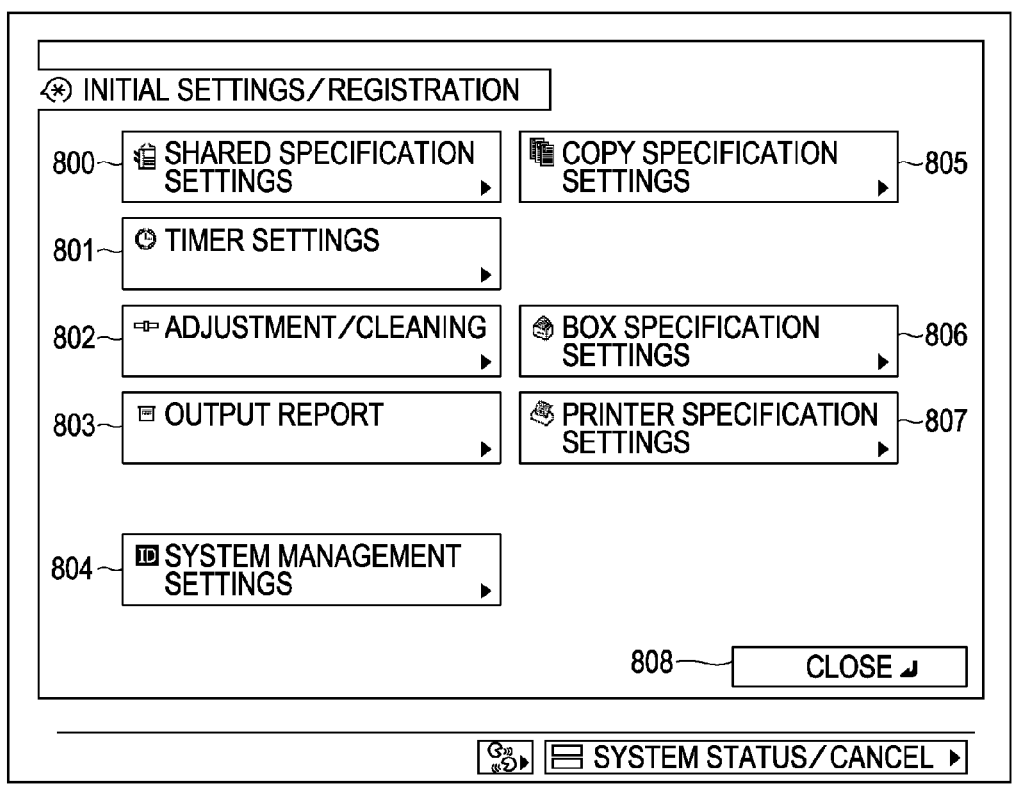
FIG. 20 is a diagram showing a display control example of a user interface unit to be controlled.
Figure 22:
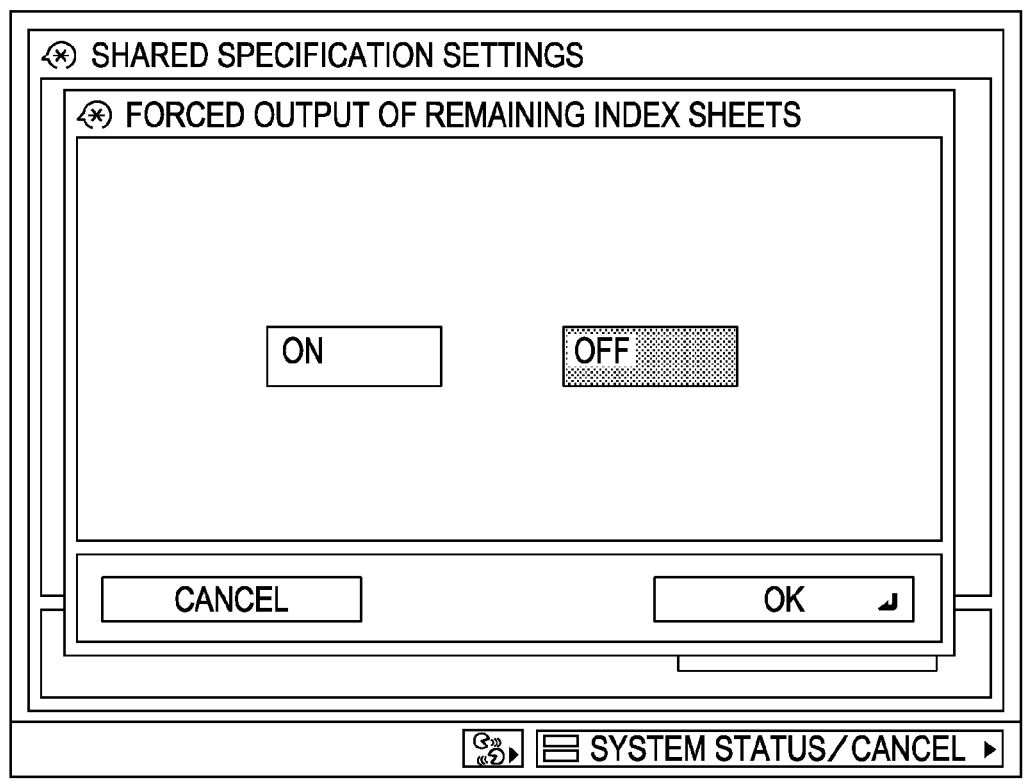
FIG. 22 is a diagram showing a display control example of a user interface unit to be controlled.
Figure 23A:
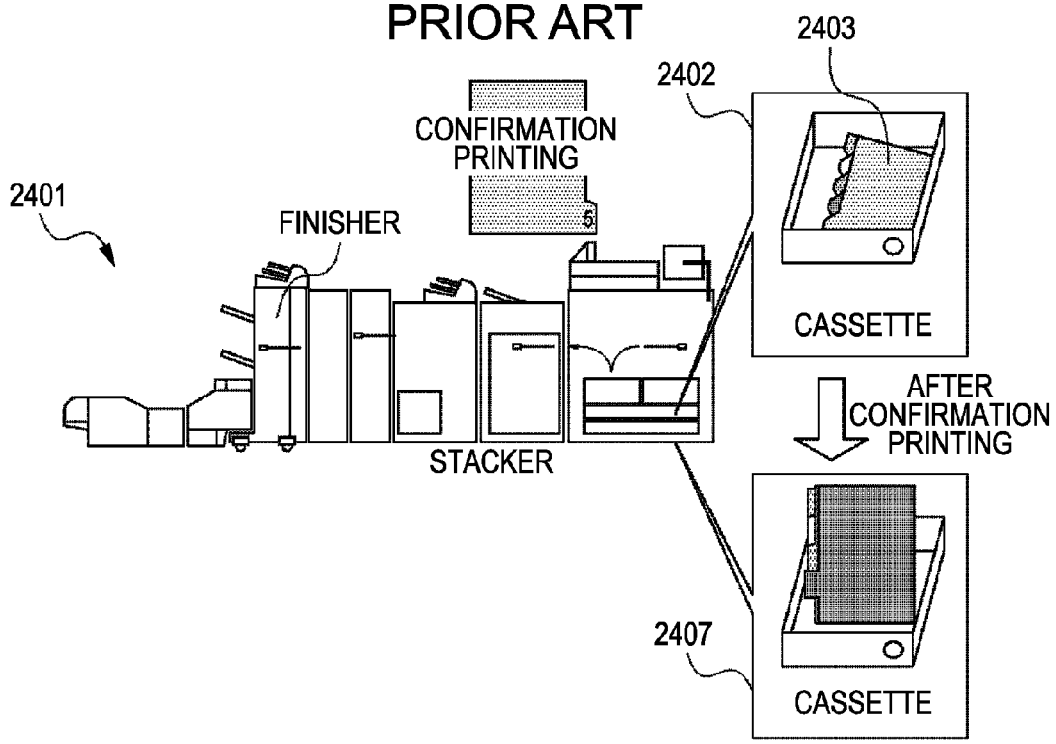
FIG. 23A is a diagram illustrating the current state of the art.
Figure 23B:
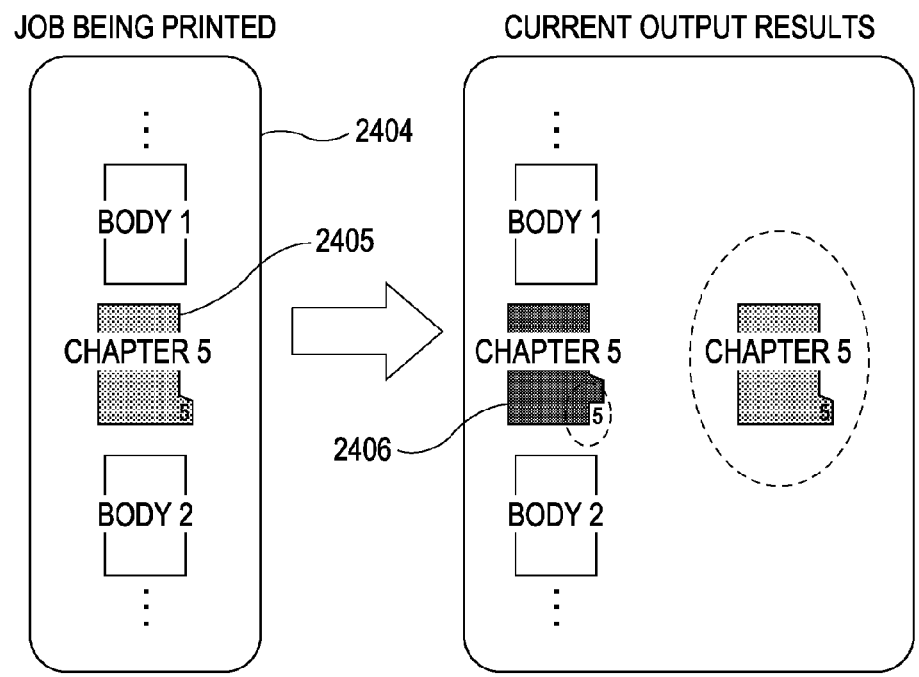
FIG. 23B is a diagram illustrating the current state of the art.

The settings for excess tab automatic output can be set beforehand as illustrated in FIG. 22, and the main printing apparatus 100 stores the main settings in HDD 209. For example, if the operator presses the user mode button 505 in the key input unit 402, a screen such as that in FIG. 20 is controlled to be displayed on the touch panel unit 401.

Figure 21:
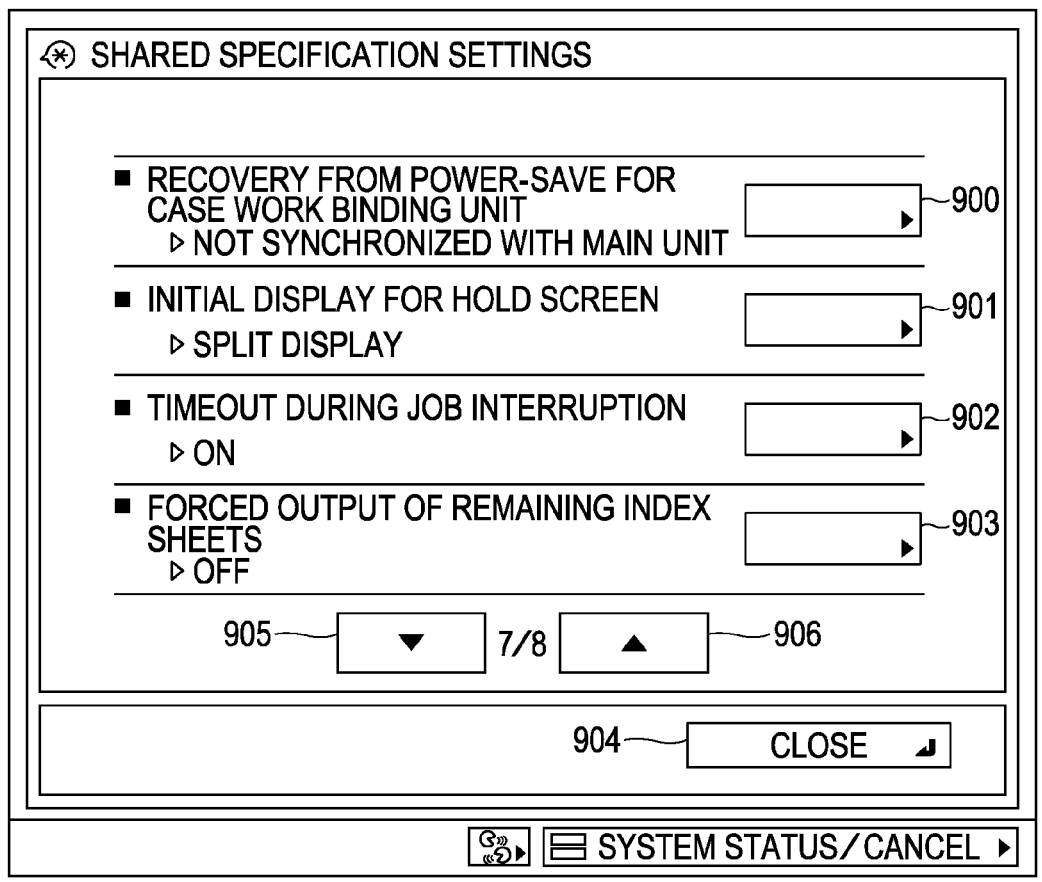
FIG. 21 is a diagram showing a display control example of a user interface unit to be controlled.

If the shared specification settings button 800 is pressed, a menu is displayed whereby shared settings of the printing apparatus 100 can be changed. If a setting button 903 is pressed on a screen as shown in FIG. 21, an excess tab automatic output setting screen (FIG. 22) is displayed, whereby ON/OFF settings are enabled.

Returning to FIG. 19, in step S305, if a one-page confirmation print is selected as the type of confirmation printing, then in step S306, the control unit 205 takes the tab sheets worth N−1 from the sheet supply wherein used tab sheets are set and outputs as excess tabs.

If the type of confirmation printing selected in step S110 is not a one-page confirmation print, then in step S309, the control unit 205 takes mN−T worth from the sheet supply wherein used tab sheets are set, and outputs as excess tabs. Now, m is a positive integer, and m is selected such that mN>T.

If the excess tab automatic output setting in step S304 is OFF, then in step S307, the control unit 205 displays a message for removing mN−T worth as excess tabs on the user interface unit 401. Also, the screen displayed in S304 includes an excess tab output ending button for notifying the control unit 205 that the removal of excess tabs has ended. If, in step S308, the control unit 205 detects that the excess tab output ending button is pressed by the user, the excess tab automatic output control processing ends, and the flow advances to the next step.

As an example, a case is described wherein control is performed to display a screen to assist the user with excess tab output in the case that the excess tab automatic output setting is OFF, but when evaluating the state of printing of large capacity jobs including tab sheets, these are not limited to such a case. For example, an arrangement may be made wherein a screen is not displayed for the user to output excess tabs, but a screen may be displayed to notify the user to turn the excess tab automatic output settings to ON. Also, in the case that the excess automatic output settings are OFF, an arrangement may be made wherein the selection screen to select whether or not tab sheets are used for confirmation printing in step S200 is not displayed, but settings may be made not to automatically use tab sheets for confirmation printing.

Second Embodiment

Figure 25:
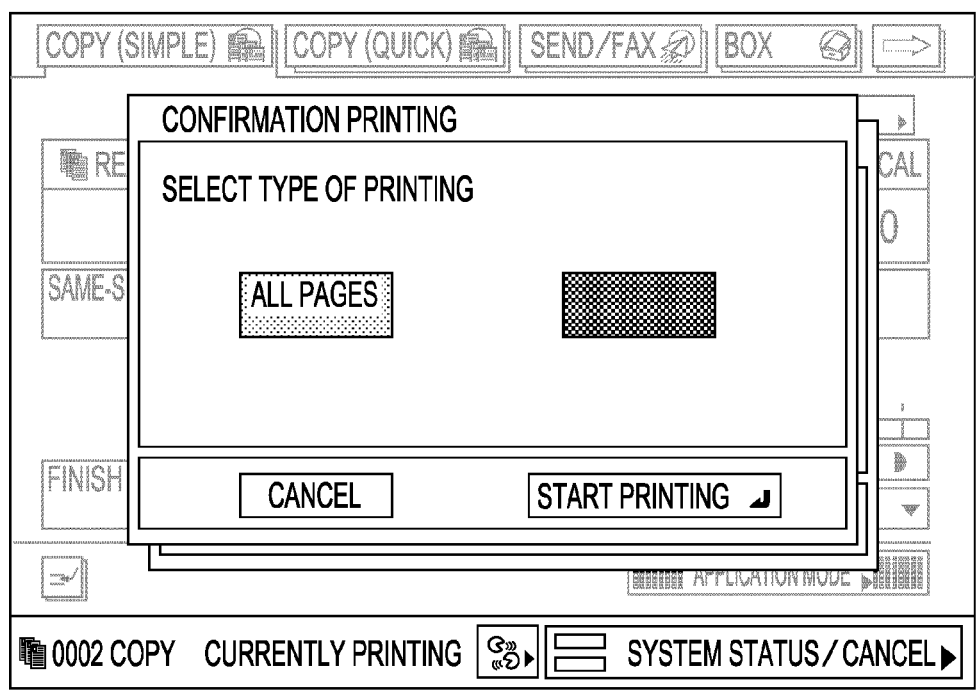
FIG. 25 is a diagram showing a display control example of a user interface unit.

In the first embodiment, in the case that a confirmation print request is received, the screen in FIG. 13B is displayed, and the user can select the type of confirmation printing. In the case that "one sheet" is selected, the control unit 205 executes the processing in FIGS. 18 and 19 to prepare for the case of using tab sheets, for example, for the confirmation print pages. In a second embodiment, a description will be provided for a processing to display a setting screen (FIG. 25) wherein the control unit 205 can specify to print from the confirmation page determined according to the confirmation print instructions up to the last page of the printing job to simplify the processing. Only the differences between the second embodiment and first embodiment will be described herein.

Figure 24:
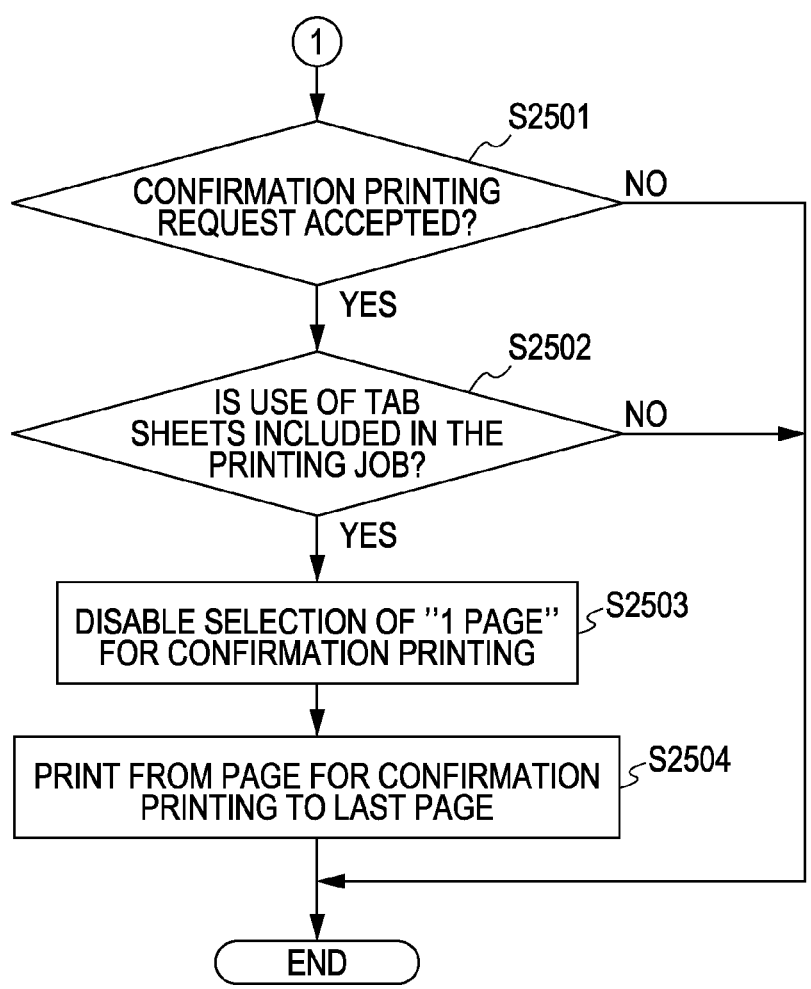
FIG. 24 is a flowchart to describe control.

The flowchart in FIG. 24 shows that processing is executed after a determination in step S107 of FIG. 17A that actual printing has not been completed.

In step S2501, The control unit 205 determines whether the confirmation print request is received. If it is determined that the request is received, then in step S2502, it is determined whether use of tab sheets is included in the printing jobs.

If it is determined in step S2502 that use of tab sheets is included, then in step S2503, the control unit 205 displays a screen (e.g. FIG. 25) whereby confirmation print "one page" cannot be selected. Note that FIG. 25 disables selecting of "one page" by, for example, graying out "one page".

In accordance with the selection in step S2503, in step S2504, the control unit 205 prints from the confirmation page determined according to the confirmation print request to the last page of the print job.

The present embodiment provides for preventing the occurrence of excess tabs which occur when the confirmation print pages are pages using tab sheets. While the processing in the second embodiment is described as a separate processes from that of the first embodiment, the process of the first embodiment may be executed following the processing of the second embodiment.

The present invention is not limited to the exemplary embodiments described above, and various modifications may be made in accordance with the spirit and the scope of the invention. For example, the control unit 205 within the printing apparatus 100 is the main unit for various types of control, but a configuration may be made to execute a portion or all of the various types of control with an externally attached controller in a separate casing from the printing apparatus 100.

According to the present invention, desired printed material can be output while realizing confirmation printing.

Note that the present invention may be applied to a system consisting of multiple apparatuses (e.g. host computer, interface apparatus, reader, printer, and so forth) or may be applied to an apparatus consisting of a single apparatus (e.g. photocopier, facsimile apparatus, and so forth). Also, the present invention can supply a recording medium which has program codes recorded therein to realize the above-described embodiment functions to a system or apparatus, and a computer of such system or apparatus reads the process codes stored in the storage medium. In this case, the program code itself which is read from the storage medium realizes the function of the above-described embodiments, and the program code itself as well as the storage medium storing the program code can make up the present invention.

Also, the present invention includes cases wherein, based on instructions from the program code, an operating system (OS) operating on a computer performs a portion or all of the actual processing, and the functions of the above-described embodiments are realized by such processing. Further, the present invention may be applied to cases wherein the program code read from the storage medium is written into memory of a function expansion card inserted in the computer or a function expansion unit connected to the computer. In such a case, based on the instructions of the program code written in, a CPU associated with the function expansion card or function expansion unit performs a portion or all of the actual processing, and the functions of the embodiment described above are realized with such processing.

Also, the embodiments of the present invention are described as apparatuses or methods configured with the present invention as a core thereof. Therefore, the embodiments also describe configuration elements which can be added to the primary portions of the present invention. That is to say, providing configuration elements for apparatuses or methods described with the embodiments of the present invention offers sufficient conditions for establishing the present invention, but these are not indispensable.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-205409 filed Aug. 7, 2007, which is hereby incorporated by reference herein in its entirety.

What is claimed is:

1. An image forming apparatus comprising:
   a receiving unit configured to receive a confirm printed material instruction to confirm printed material of a printing job during printing processing of the printing job, wherein the printing job includes at least one page printed on a specialized recording medium for printing;
   a first determining unit configured to determine a first page to be printed, as a confirmation page, from pages included in the printing job according to the confirm printed material instruction received by the receiving unit;
   a second determining unit configured to determine, when the first page is printed on the specialized recording medium, a second page to be printed as a confirmation page, wherein the second page is printed on a recording medium different from the specialized recording medium from the pages included in the printing job; and
   a display unit configured to display a screen to enable or disable a function to output an excess recording medium of the specialized recording medium,
   wherein the specialized recording medium is included in one set composed of a plurality of the specialized recording media,
   wherein the excess recording medium is a sheet which is excess of the one set, and
   wherein, during printing processing of the printing job and in response to the confirm printed material instruction, when the first page is printed on the specialized recording medium, the first page is printed in a single specialized recording medium and the second page is printed in two recording media other than the plurality of specialized recording media, and when the first page is not printed on the specialized recording medium, the first page is printed in two recording media other than the plurality of specialized recording media and the second page is printed in a single recording medium other than the plurality of specialized recording media, wherein one of the two printed recording media is the confirmation page as per the confirm printed material instruction.

2. The image forming apparatus according to claim 1, further comprising:
   an input unit configured to input printing processing content for confirming the printed material; and
   a third determining unit configured to determine whether pages following the first page include a page printed on the specialized recording medium,
   wherein, in response to determining that input is made with the input unit to print using a recording medium different from the specialized recording medium and the third determining unit determining that there are no pages printed on the specialized recording medium for any pages following the first page, the first page which is determined by the first determining unit is printed using a recording medium that is different from the specialized recording medium.

3. The image forming apparatus according to claim 1, wherein the specialized recording medium is a tab sheet.

4. A method for an image forming apparatus, the method comprising:
   receiving a confirm printed material instruction to confirm printed material of a printing job during printing processing of the printing job, wherein the printing job includes at least one page printed on a specialized recording medium for printing;
   determining a first page to be printed, as a confirmation page, from pages included in the printing job according to the received confirm printed material instruction;
   determining, using a central processing unit and when the first page is printed on the specialized recording medium, a second page to be printed as a confirmation page, wherein the second page is printed on a recording medium different from the specialized recording medium from the pages included in the printing job; and
   displaying a screen to enable or disable a function to output an excess recording medium of the specialized recording medium,
   wherein the specialized recording medium is included in one set composed of a plurality of the specialized recording media,
   wherein the excess recording medium is a sheet which is excess of the one set, and
   wherein, during printing processing of the printing job and in response to the confirm printed material instruction, when the first page is printed on the specialized recording medium, the first page is printed in a single specialized recording medium and the second page is printed in two recording media other than the plurality of specialized recording media, and when the first page is not printed on the specialized recording medium, the first page is printed in two recording media other than the plurality of specialized recording media and the second page is printed in a single recording medium other than the plurality of specialized recording media, wherein one of the two printed recording media is the confirmation page as per the confirm printed material instruction.

5. The method according to claim 4, further comprising:
   inputting printing processing content for confirming the printed material; and
   determining whether pages following the first page include a page printed on the specialized recording medium,
   wherein, in response to determining that input is made to print using a recording medium different from the specialized recording medium and determining that there are no pages printed on the specialized recording medium for any pages following the first page, the determined first page is printed using a recording medium that is different from the specialized recording medium.

6. The method according to claim 4, wherein the specialized recording medium is a tab sheet.

7. A non-transitory computer-readable medium storing a program causing an image forming apparatus to perform a method, the method comprising:
- receiving a confirm printed material instruction to confirm printed material of a printing job during printing processing of the printing job, wherein the printing job includes at least one page printed on a specialized recording medium for printing;
- determining a first page to be printed, as a confirmation page, from pages included in the printing job according to the received confirm printed material instruction;
- determining, using a central processing unit and when the first page is printed on the specialized recording medium, a second page to be printed as a confirmation page, wherein the second page is printed on a recording medium different from the specialized recording medium from the pages included in the printing job; and
- displaying a screen to enable or disable a function to output an excess recording medium of the specialized recording medium,
- wherein the specialized recording medium is included in one set composed of a plurality of the specialized recording media,
- wherein the excess recording medium is a sheet which is excess of the one set, and
- wherein, during printing processing of the printing job and in response to the confirm printed material instruction, when the first page is printed on the specialized recording medium, the first page is printed in a single specialized recording medium and the second page is printed in two recording media other than the plurality of specialized recording media, and when the first page is not printed on the specialized recording medium, the first page is printed in two recording media other than the plurality of specialized recording media and the second page is printed in a single recording medium other than the plurality of specialized recording media, wherein one of the two printed recording media is the confirmation page as per the confirm printed material instruction.

8. The non-transitory computer-readable medium according to claim 7, further comprising:
- inputting printing processing content for confirming the printed material; and
- determining whether pages following the first page include a page printed on the specialized recording medium,
- wherein, in response to determining that input is made to print using a recording medium different from the specialized recording medium and determining that there are no pages printed on the specialized recording medium for any pages following the first page, the determined first page is printed using a recording medium that is different from the specialized recording medium.

9. The non-transitory computer-readable medium according to claim 7, wherein the specialized recording medium is a tab sheet.

10. The image forming apparatus according to claim 1, wherein printed material of the second page is conveyed to an escape path.

11. The method according to claim 4, wherein printed material of the second page is conveyed to an escape path.

12. The non-transitory computer-readable medium according to claim 7, wherein printed material of the second page is conveyed to an escape path.

13. The image forming apparatus according to claim 3, wherein, in response to setting information for a shifting processing for printing on the specialized recording medium being set as to the first page, the image forming apparatus prints the first page on a recording medium that is different from the specialized recording medium without executing the shifting processing based on the setting information.

14. The method according to claim 6, wherein, in response to setting information for a shifting processing for printing on the specialized recording medium being set as to the first page, the image forming apparatus prints the first page on a recording medium that is different from the specialized recording medium without executing the shifting processing based on the setting information.

15. The non-transitory computer-readable medium according to claim 9, wherein, in response to setting information for a shifting processing for printing on the specialized recording medium being set as to the first page, the image forming apparatus prints the first page on a recording medium that is different from the specialized recording medium without executing the shifting processing based on the setting information.

* * * * *